United States Patent
Hayashi et al.

(10) Patent No.: US 9,267,420 B2
(45) Date of Patent: Feb. 23, 2016

(54) ENGINE COOLING CONTROL DEVICE

(75) Inventors: Kunihiko Hayashi, Odawara (JP);
Syusaku Sugamoto, Susono (JP);
Yoshio Hasegawa, Susono (JP);
Hirokazu Hata, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/353,637

(22) PCT Filed: May 24, 2012

(86) PCT No.: PCT/JP2012/063253
§ 371 (c)(1),
(2), (4) Date: Jul. 28, 2014

(87) PCT Pub. No.: WO2013/069325
PCT Pub. Date: May 16, 2013

(65) Prior Publication Data
US 2014/0326199 A1   Nov. 6, 2014

(30) Foreign Application Priority Data

Nov. 7, 2011   (JP) ................. 2011-243793

(51) Int. Cl.
*F01P 5/10*   (2006.01)
*F01P 3/00*   (2006.01)
*F16K 11/076*   (2006.01)
(Continued)

(52) U.S. Cl.
CPC ... *F01P 3/00* (2013.01); *F01P 7/14* (2013.01);
*F16K 11/076* (2013.01); *F01P 5/10* (2013.01);
(Continued)

(58) Field of Classification Search
CPC ............... F01P 5/10; F01P 5/12; F01P 7/164;
F01P 2005/125; F02B 75/22
USPC ........................................................ 123/41.44
See application file for complete search history.

(56) References Cited

U.S. PATENT DOCUMENTS 3,180,362 A    4/1965  Muller
4,256,285 A *  3/1981  Davidson ...................... 251/283
(Continued)

FOREIGN PATENT DOCUMENTS

JP    58-34276 A    2/1983
JP    05-215256 A   8/1993
(Continued)

OTHER PUBLICATIONS

International Application for PCT/JP2012/063253 dated Aug. 28, 2012.

*Primary Examiner* — Lindsay Low
*Assistant Examiner* — Charles Brauch
(74) *Attorney, Agent, or Firm* — Sughrue Mion, PLLC

(57) ABSTRACT

An engine cooling control device 100 includes: a housing portion 11A that has passages $Pa_{in}$, $PA_{out}1$ and PA2; a rotor 12 that is provided in an intermediate portion M and has a rotation center at a position where at least two of distances between openings of the passages $PA_{in}$, $PA_{out}1$ and $PA_{out}2$ opening toward the intermediate portion M and the rotation center are different from each other; a sealing function portion 13A provided between the housing portion 11A and the rotor 12; an elastic member 14 that is provided between the rotor 12 and the sealing function portion 13A and individually biases the sealing function portion 13A toward each opening of the passages $PA_{in}$, $PA_{out}1$ and $PA_{out}2$ with respect to different phases of the rotor 12.

5 Claims, 22 Drawing Sheets

(51) Int. Cl.
*F01P 7/14* (2006.01)
*F01P 5/12* (2006.01)
*F02B 75/22* (2006.01)
*F01P 7/16* (2006.01)
*F01P 3/02* (2006.01)

(52) U.S. Cl.
CPC .. *F01P 5/12* (2013.01); *F01P 7/164* (2013.01); *F01P 2003/001* (2013.01); *F01P 2003/027* (2013.01); *F01P 2005/125* (2013.01); *F01P 2060/08* (2013.01); *F02B 75/22* (2013.01)

(56) References Cited

U.S. PATENT DOCUMENTS

| | | | |
|---|---|---|---|
| 4,436,116 A | 3/1984 | Billeter | |
| 5,188,149 A | 2/1993 | Williams | |
| 2004/0154671 A1 | 8/2004 | Martins et al. | |
| 2006/0214017 A1 | 9/2006 | Vacca et al. | |
| 2007/0137592 A1* | 6/2007 | Hanai | 123/41.14 |

FOREIGN PATENT DOCUMENTS

| | | |
|---|---|---|
| JP | 2002-276364 A | 9/2002 |
| JP | 2004-534191 A | 11/2004 |
| JP | 2005-054997 A | 3/2005 |
| JP | 2005-510668 A | 4/2005 |
| JP | 2006-512547 A | 4/2006 |
| JP | 2006-283677 A | 10/2006 |
| JP | 2008-051197 A | 3/2008 |
| JP | 2011-021753 A | 2/2011 |
| WO | 03/046342 A1 | 6/2003 |

* cited by examiner

ENGINE COOLING CONTROL DEVICE

CROSS REFERENCE TO RELATED APPLICATIONS

This application is a National Stage of International Application No. PCT/JP2012/063253 filed May 24, 2012, claiming priority based on Japanese Patent Application No. 2011-243793, filed Nov. 7, 2011, the contents of all of which are incorporated herein by reference in their entirety.

TECHNICAL FIELD

The present invention relates to an engine cooling control device.

BACKGROUND ART

Patent Documents 1 and 2 disclose a technology that is thought as a technology related to the present invention with respect to an engine cooling control device. Patent Documents 1 and 2 disclose a control valve including a main body having a fluid entrance and at least two fluid exits in which an adjustment member that can adjust an angular position variously in order to control distribution of the fluid passing through the fluid exit is surrounded by a sealing with a small clearance. The control valve makes the sealing contact a side wall in which the fluid exit opens under a function of a pressure of the fluid in order to prevent erroneous leakage of the fluid to the exit. In addition, Patent Document 3 discloses a technology that is thought as a technology related to the present invention in a point that an outer wheel of a roller bearing rolling and contacting a slider is disclosed. Further, Patent Documents 4 to 7 disclose a technology that is though as a technology related to the present invention.

PRIOR ART DOCUMENTS

Patent Documents

Patent Document 1: Japanese Published Examined Application No. 2011-21753
Patent Document 2: Japanese Published Application No. 2006-512547
Patent Document 3: Japanese Published Application No. 2008-51197
Patent Document 4: Japanese Published Application No. 2004-534191
Patent Document 5: Japanese Published Application No. 2005-510668
Patent Document 6: Japanese Published Application No. 2006-283677
Patent Document 7: Japanese Published Application No. 2005-54997

SUMMARY OF THE INVENTION

Problems to be Solved by the Invention

It is thought that a sealing function portion pressed to a housing portion by a pressure of coolant water is provided between the housing portion and a rotor as in the case of the control valve discloses in Patent Documents 1 and 2 in order to prevent coolant water leakage in an engine cooling control device. However, in this case, for example, when the coolant water is supplied in accordance with a rotation number of an engine during rapid increasing of the rotation number based on an output requirement at a stopping of a circulation of the coolant water to the engine, the pressure of the coolant water pressing the sealing member to the housing portion is also increased. As a result, responsibility of the rotor is degraded, the stopping of the circulation of the coolant water cannot be canceled promptly. And, the engine may overheat.

In view of the problem described above, it is an object of the present invention to provide an engine cooling control device that is capable of preferably performing an engine cooling control.

Means for Solving the Problems

The present invention is an engine cooling control device including: a housing portion that has a plurality of passages including at least one entrance side passage for inflowing coolant water of an engine and at least one exit side passage for outflowing the coolant water of the engine; a rotor that is provided in an intermediate portion to which the plurality of passages open and controls a circulation of the coolant water of the engine via the plurality of passages with a rotation operation; a sealing function portion that is provided between the housing portion and the rotor and can roll together with the rotor; and an elastic member that is provided between the rotor and the sealing function portion and biases the sealing function portion to at least an opening of the entrance side passage of the plurality of passages in accordance with a phase control of the rotor and makes the sealing function portion contact the opening.

The present invention may have a pump that squeezes the coolant water of the engine, wherein the plurality of passages may have a first passage group and a second passage group, the first passage group having a passage circulating coolant water from the pump to the engine, the second passage group having a passage circulating coolant water from the engine to the pump, the first passage group and the second passage group may be located at a different position in a direction along an axis line of a rotation center of the rotor, and the sealing function portion may have a pressed portion pressed to the rotor between the first passage group and the second passage group in a direction along the axis line of the rotation center of the rotor.

The present may have a structure wherein: the rotation center of the rotor is located so that at least two of distances between the rotation center and openings of the plurality of passages opening toward the intermediate portion are different from each other from a view along the axis line of the rotation center; and the elastic member individually biases the sealing function portion toward the openings of the plurality of passages with respect to each different phase of the rotor.

The present invention may have a structure wherein a space is provided between the sealing function portion and an opening of a predetermined passage of the plurality of passages under a condition that the sealing function portion is biased to the opening of the predetermined passage.

The present invention may have a plurality of rolling elements in four directions of the rotation center of the rotor from a view along the axis line of the rotation center of the rotor.

The present invention may have a structure wherein an opening of at least one of the plurality of passages has a seal face formed in accordance with an outside shape of the sealing function portion that faces with the opening under a condition where a phase of the rotor is controlled to a corresponding phase.

Effects of the Invention

According to the present invention, it is possible to preferably perform an engine cooling control.

MODES FOR CARRYING OUT THE INVENTION

Embodiments for carrying out the present invention are now described with reference to the drawings.

First Embodiment

Figure 1:
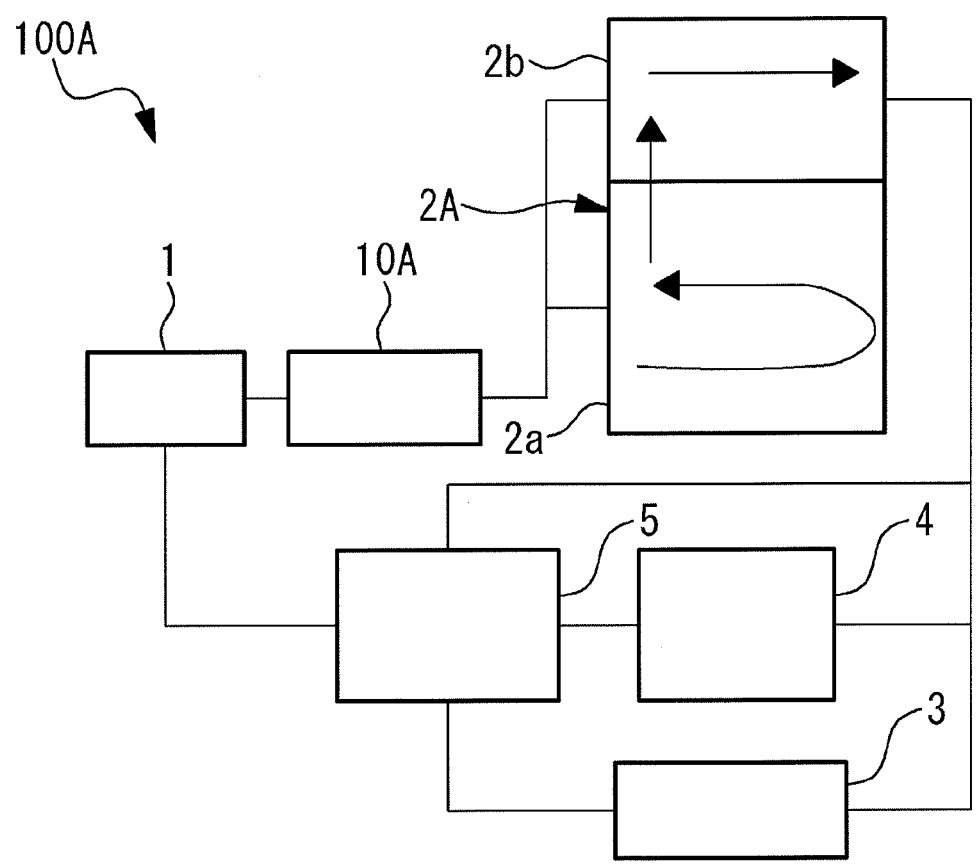
FIG. 1 illustrates an engine cooling circuit of a first embodiment.

FIG. 1 illustrates an engine cooling circuit 100A (hereinafter referred to as a cooling circuit) having an engine cooling control device 10A (hereinafter referred to as a cooling control device). The cooling circuit 100A is mounted on a vehicle not illustrated. The cooling circuit 100A has a water pump (hereinafter referred to as a W/P) 1, a cooling control device 10A, an engine 2A, a radiator 3, a heater core 4, and a thermostat 5.

The W/P 1 circulates coolant water of the engine 2A. The W/P 1 is a mechanical pump driving with use of an output of the engine 2A. The W/P 1 may be an electric driven pump.

The coolant water ejected by the W/P 1 is supplied to the cooling control device 10A. The cooling control device 10A supplies the coolant water supplied by the W/P 1 to the engine 2A.

The engine 2A has a cylinder block 2a and a cylinder head 2b. In concrete, the cooling control device 10A is coupled to the cylinder block 2a and the cylinder head 2b so as to supply the coolant water to the cylinder block 2a and the cylinder head 2b. A circulation route circulating the coolant water to the cylinder block 2a and the cylinder head 2b in order and a circulation route circulating the coolant water to the cylinder head 2b are formed in the engine 2A. These circulation routes combine with each other at the cylinder head 2b.

The coolant water having circulated in the engine 2A is separated into the radiator 3, the heater core 4 and the thermostat 5. The radiator 3 performs a thermal exchange between air and the coolant water, and cools the coolant water. The heater core 4 performs a thermal exchange between the air and the coolant water, and heats the air. The heater core 4 is used as an air conditioner for performing air conditioning in a vehicle interior. The thermostat 5 performs a circulation control of the coolant water in accordance with a temperature of the coolant water.

The thermostat 5 is provided at a point where a circulation route coupling the engine 2A and the W/P 1 and a circulation route coupling the radiator 3 and the W/P 1 combine with each other with respect to a circulation route coupling the heater core 4 and the W/P 1. And, the thermostat 5 performs a circulation limitation of the coolant water via the circulation route coupling the engine 2A and the W/P 1, canceling of the circulation limitation, a circulation limitation of the coolant water via the circulation route coupling the radiator 3 and the W/P 1, and canceling of the circulation limitation.

The thermostat 5 limits the circulation of the coolant water via the circulation route coupling the radiator 3 and the W/P 1 and cancels a circulation limitation of the coolant water via the circulation route coupling the engine 2A and the W/P 1, when the temperature of the coolant water is lower than a predetermined value $\alpha$. The thermostat 5 cancels the circulation limitation of the coolant water via the circulation route coupling the radiator 3 and the W/P 1 and limits the circulation of the coolant water via the circulation route coupling the engine 2A and the W/P 1 when the temperature of the coolant water is higher than the predetermined value $\alpha$ (in concrete, equal to or more than the predetermined value $\alpha$).

Therefore, the coolant water separated into the heater core 4 returns to the W/P 1 via the thermostat 5 after circulating the heater core 4. On the other hand, the coolant water separated into the radiator 3 and the coolant water separated into the thermostat 5 return to the W/P 1 via the thermostat 5 under the circulation limitation of the coolant water by the thermostat 5. The limitation and the canceling the limitation include forbidding and allowing.

Figure 2:
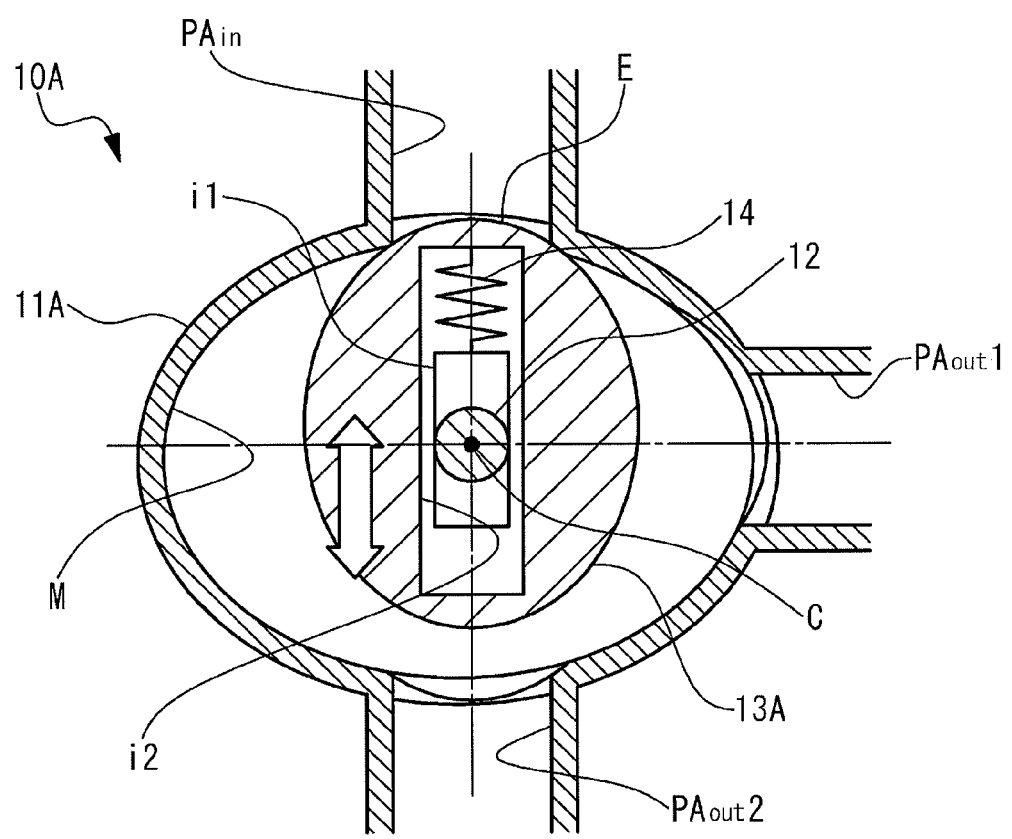
FIG. 2 illustrates an engine cooling control device of the first embodiment.

FIG. 2 illustrates the cooling control device 10A. The cooling control device 10A has a housing portion 11A, a rotor 12, a sealing function portion 13A and an elastic member 14. The housing portion 11A has a passage $PA_{in}$ for inflowing the coolant water supplied from the W/P 1 as an entrance side passage. The housing portion 11A has a passage $PA_{out}1$ for outflowing the coolant water supplied to the cylinder block 2a and a passage $PA_{out}2$ for outflowing the coolant water supplied to the cylinder head 2b as an exit side passage. The passage $PA_{in}$, the passage $PA_{out}1$ and the passage $PA_{out}2$ are a plurality of passages having at least one entrance side passage and at least one exit side passage.

The rotor 12 is provided in an intermediate portion M in which the passage $PA_{in}$, the passage $PA_{out}1$ and the passage $PA_{out}2$ open in the housing portion 11A. The intermediate portion M houses the rotor 12 controlling the circulation of the coolant water via the passage $PA_{in}$, the passage $PA_{out}1$ and the passage $PA_{out}2$ by a rotation operation. In concrete, the passage $PA_{in}$, the passage $PA_{out}1$ and the passage $PA_{out}2$ open against the intermediate portion M from a side of the rotor 12 in accordance with different phases of the rotor 12. A rotation center of the rotor 12 is set so that the rotor 12 has different distances to openings of the passage $PA_{in}$, the passage $PA_{out}1$ and the passage $PA_{out}2$ at least between two of them from a view along an axis line C of the rotation center of the rotor 12. This point will be described later.

The sealing function portion 13A is provided between the housing portion 11A and the rotor 12. The sealing function portion 13A is structured with a sealing member (for example, resin or rubber). The sealing function portion 13A is capable of rotating with the rotor 12. The sealing function portion 13A is capable of sliding along a direction that is vertical to the axis line C with respect to the rotor 12. When the sealing function portion 13A is provided, the rotor 12 and the sealing function portion 13A have an engagement portions i1 and i2, in concrete.

The engagement portion i1 is provided in the rotor 12 and has a block shape looking like a rectangular shape from a view along the axis line C. The engagement portion i2 is provided in the sealing function portion 13A and has a slot shape looking like a rectangular shape from a view along the axis line C. The engagement portions i1 and i2 can rotate the sealing function portion 13A together with the rotor 12 and can slide the sealing function portion 13A along a direction vertical to the axis line C with respect to the rotor 12, with the engagement portion i1 being housed in the engagement portion i2.

In concrete, the engagement portion i1 has slide walls at even intervals with the axis line C being sandwiched from a view along the axis line C. The engagement portion i2 has slide walls according to the slide walls of the engagement portion i1. An interval of the slide walls of the engagement portion i2 is larger than an interval of the slide walls of the engagement portion i1 by a sliding clearance. An interval of both edge walls of the engagement portion i2 may be larger than an interval of both edge walls of the engagement portion i1 in accordance with a movable range needed for the sealing function portion 13A.

The sealing function portion 13A has a contact portion E contacting an opening of at least one of the passages $PA_{in}$, $PA_{out}1$ and $PA_{out}2$. The sealing function portion 13A partially contacts the housing portion 11A when the contact portion E contacts the opening of the passages $PA_{in}$, $PA_{out}1$ and $PA_{out}2$. That is, the sealing function portion 13A is provided so that a part of the sealing function portion 13A other than the contact portion E does not contact the housing portion 11A.

In concrete, an outside shape of the sealing function portion 13A is an ellipse shape from a view along the axis line C, and the outside shape of the sealing function portion 13A is smaller than an inside shape of the intermediate portion M. And, a part of the sealing function portion 13A that is positioned on one side in a longitudinal axis of the outside ellipse shape is the contact portion E, and the slide wall of the engagement portion i2 is provided along the longitudinal axis of the outside shape.

The elastic member 14 is provided between the rotor 12 and the sealing function portion 13A. In concrete, the elastic member 14 is provided between one of the both edge walls of the engagement portion i1 and one of the both edge walls of the engagement portion i2 facing with the one of the edge walls of the engagement portion i1 from view along the axis line C. The elastic member 14 is, for example, a spring. When the elastic member 14 biases the sealing function portion 13A toward the housing portion 11A from the rotor 12, the elastic member 14 individually biases the sealing function portion 13A against the opening portions of the passages $PA_{in}$, $PA_{out}1$ and $PA_{out}2$ with respect to each different phase of the rotor 12.

The contact portion E is a part of the sealing function portion 13A that is positioned on the side biased by the elastic member 14. An outer face of the contact portion E is a part facing with the openings of the passages $PA_{in}$, $PA_{out}1$ and $PA_{out}2$ under a condition that the rotor 12 is controlled to a corresponding phase. In concrete, the elastic member 14 biases the sealing function portion 13A so that the sealing function portion 13A is slid against the rotor 12.

In concrete, the housing portion 11A is provided so that the inside shape of the intermediate portion M is a ellipse shape from a view along the axis line C. And, the passage $PA_{in}$ is provided so as to open toward the intermediate portion M from one side of the inside shape in a short axis direction, and the passage $PA_{out}2$ is provided so as to open toward the intermediate portion M from the other side of the inside shape in the short axis direction. And, the passage $PA_{out}1$ is provided so as to open toward the intermediate portion M from one side of the inside shape in the long axis direction.

In concrete, the passages $PA_{in}$ and $PA_{out}2$ are provided so as to open toward the intermediate portion M in accordance with the short axis of the inside shape. And, the passage $PA_{out}1$ is provided so as to open toward the intermediate portion M in accordance with the long axis of the inside shape. The passages $PA_{in}$ and $PA_{out}2$ extends along the short axis of the inside shape and opens toward the intermediate portion M, and the passage $PA_{out}1$ extends along the long axis of the inside shape and opens toward the intermediate portion M. The passages $PA_{in}$, $PA_{out}1$ and $PA_{out}2$ are provided in this order along a rotation direction of the rotor 12.

On the other hand, a rotation center of the rotor 12 is off the ellipse center of the inside shape to the side of the passage $PA_{in}$ from a view along the axis line C. Therefore, the passage $PA_{in}$ is provided so that a distance between the rotation center of the rotor 12 and the opening is shorter than the passages $PA_{out}1$ and $PA_{out}2$. The passage $PA_{out}2$ is provided so that a distance between the rotation center of the rotor 12 and the opening is shorter than the passage $PA_{out}1$. That is, the rotation center of the rotor 12 is provided so that distances to the openings of the passages $PA_{in}$, $PA_{out}1$ and $PA_{out}2$ are different from each other.

Figure 3:
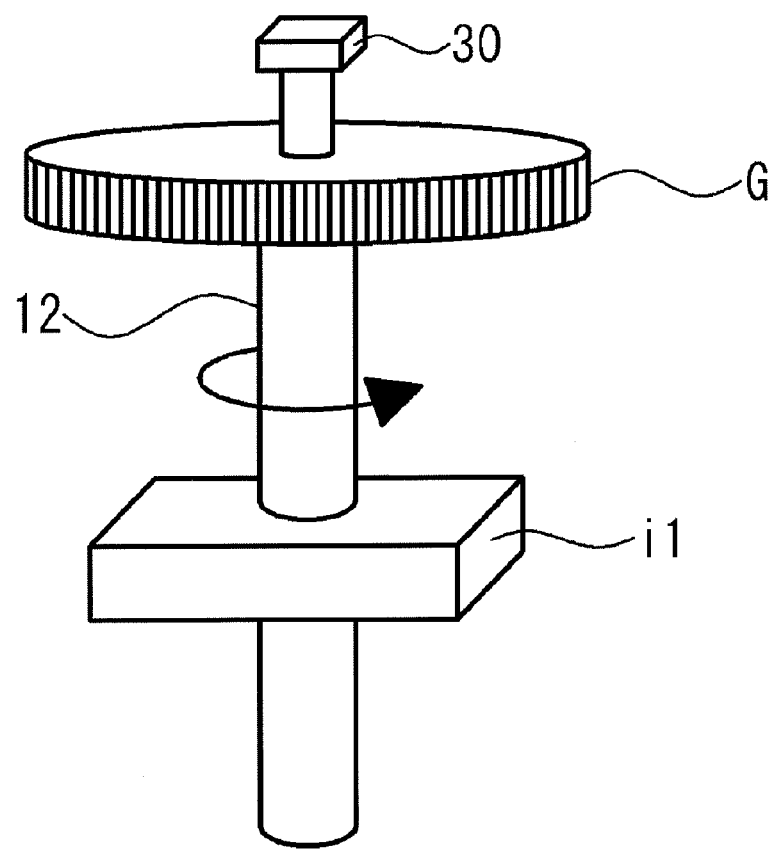
FIG. 3 illustrates only a rotor.

FIG. 3 illustrates only the rotor 12. As illustrated in FIG. 3, the rotor 12 has a gear portion G to which a driving force is input from an actuator, in addition to the engagement portion i1. Thereby, it is possible to change the phase with use of the actuator. A rotation angle sensor 30 that is capable of detecting the phase of the rotor 12 is provided with respect to the rotor 12. Thereby, it is possible to detect a current control mode.

Figure 4:
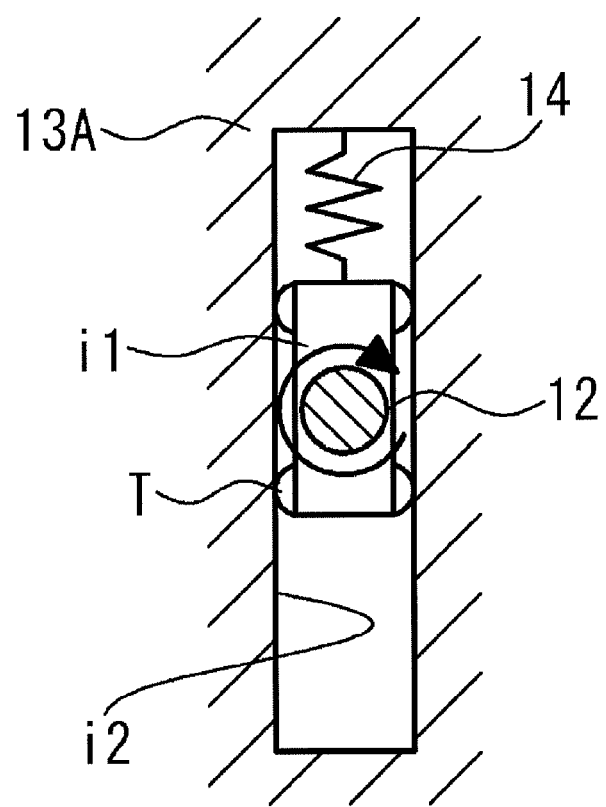
FIG. 4 illustrates an engagement portion.

FIG. 4 illustrates the engagement portions i1 and i2. As illustrated in FIG. 4, the cooling control device 10A has a plurality of (four in this case) rolling members T that are positioned in four directions of the rotation center of the rotor 12 between the rotor 12 and the sealing function portion 13A from a view along the axis line C. In concrete, the rolling members T are positioned between the engagement portions i1 and i2, are provided in the engagement member i1 so as to roll, and are provided so as to roll and contact the engagement member i2. The rolling member T is, for example, a ball. The rolling member T may be a circular column member.

Figure 5:
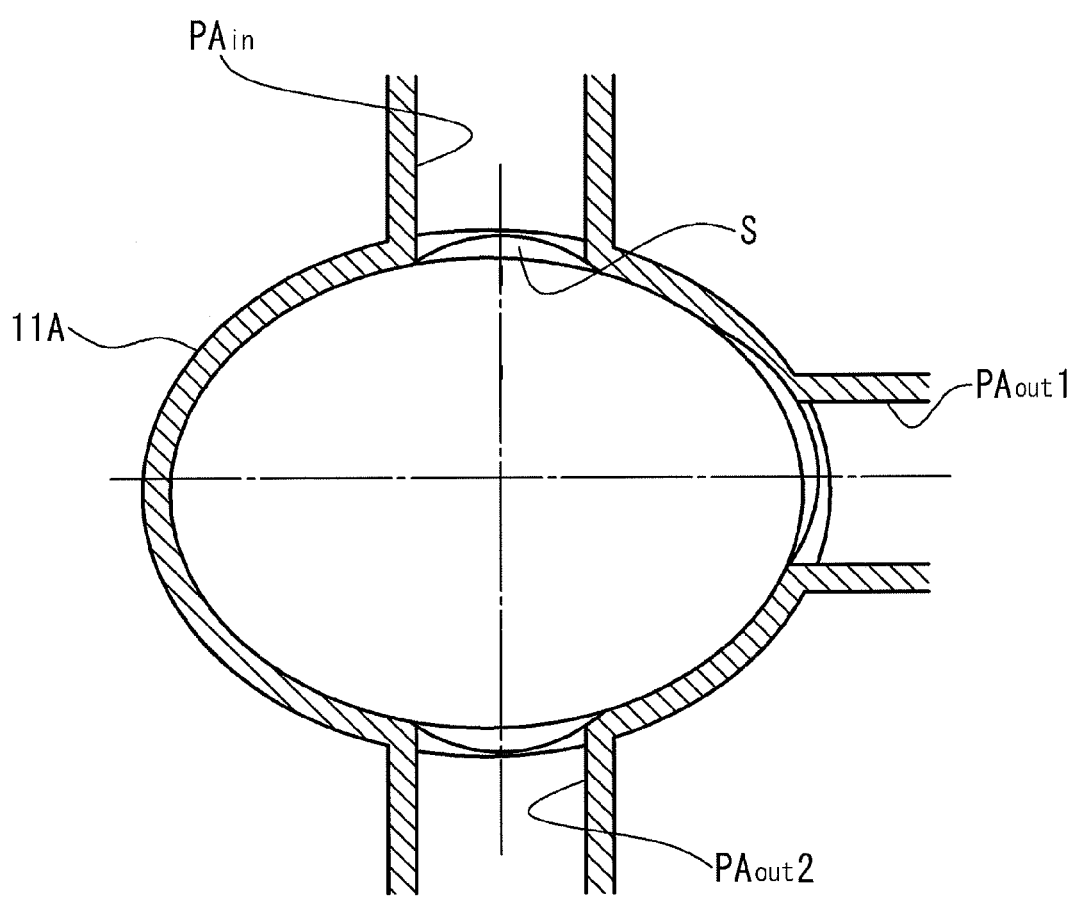
FIG. 5 illustrates an opening of a passage.

FIG. 5 illustrates the openings of the passages $PA_{in}$, $PA_{out}1$ and $PA_{out}2$. As illustrated in FIG. 5, in the cooling control device 10A, all openings of the passages $PA_{in}$, $PA_{out}1$ and $PA_{out}2$ have a seal face S formed in accordance with the outside shape of the contact portion E. Thereby, at least one of the openings of the passages $PA_{in}$, $PA_{out}1$ and $PA_{out}2$ has the seal face S formed in accordance with the outside shape of the contact portion E.

The cooling control device 10A has a water-stopping mode stopping the circulation of the coolant water via the cylinder block 2a and the cylinder head 2b, a block stagnation mode forbidding the circulation of the coolant water via the cylinder block 2a and allowing the circulation of the coolant water via the cylinder head 2b, and an all flow amount mode allowing the circulation of the coolant water via the cylinder block 2a and the cylinder head 2b as a cooling control of the engine 2A with respect to different phases of the rotor 12.

The water-stopping mode is a control mode that is capable of promoting a heating of the engine 2A. The block stagnation mode is a control mode that is capable of reducing cooling loss of the engine 2A. The all flow amount mode is a control mode that is capable of enhancing the cooling performance of the engine 2A. And, the cooling control device 10A switches the cooling control of the engine 2A between the control modes by changing the phase of the rotor 12.

Figure 6A:
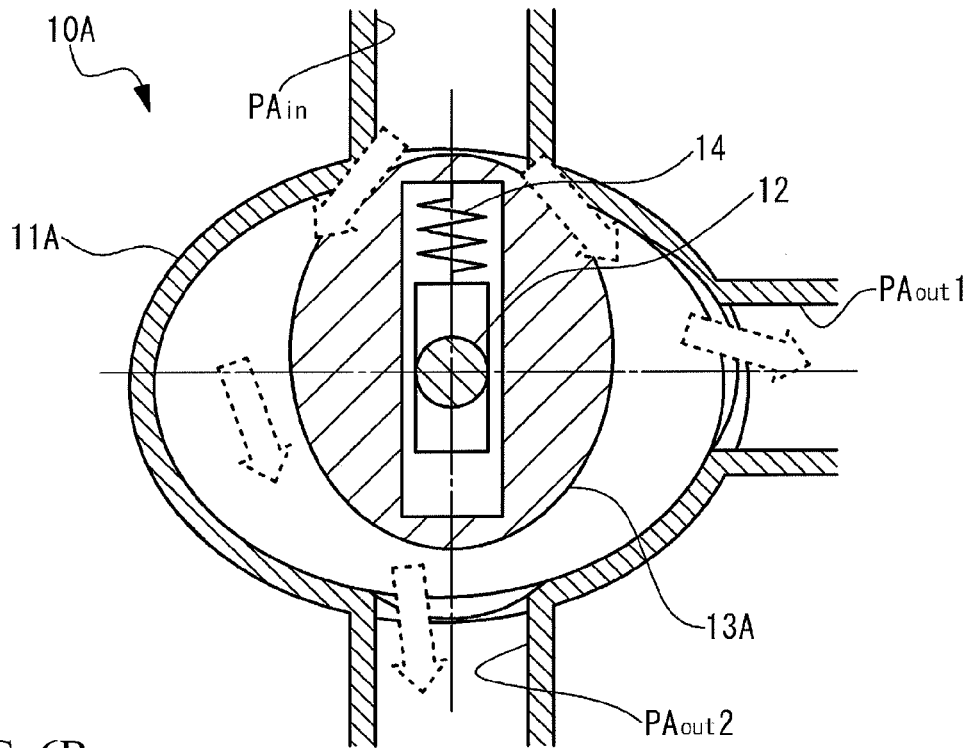
FIG. 6A and FIG. 6B illustrate a first figure of an explanatory diagram of an operation of the first embodiment.
Figure 6B:
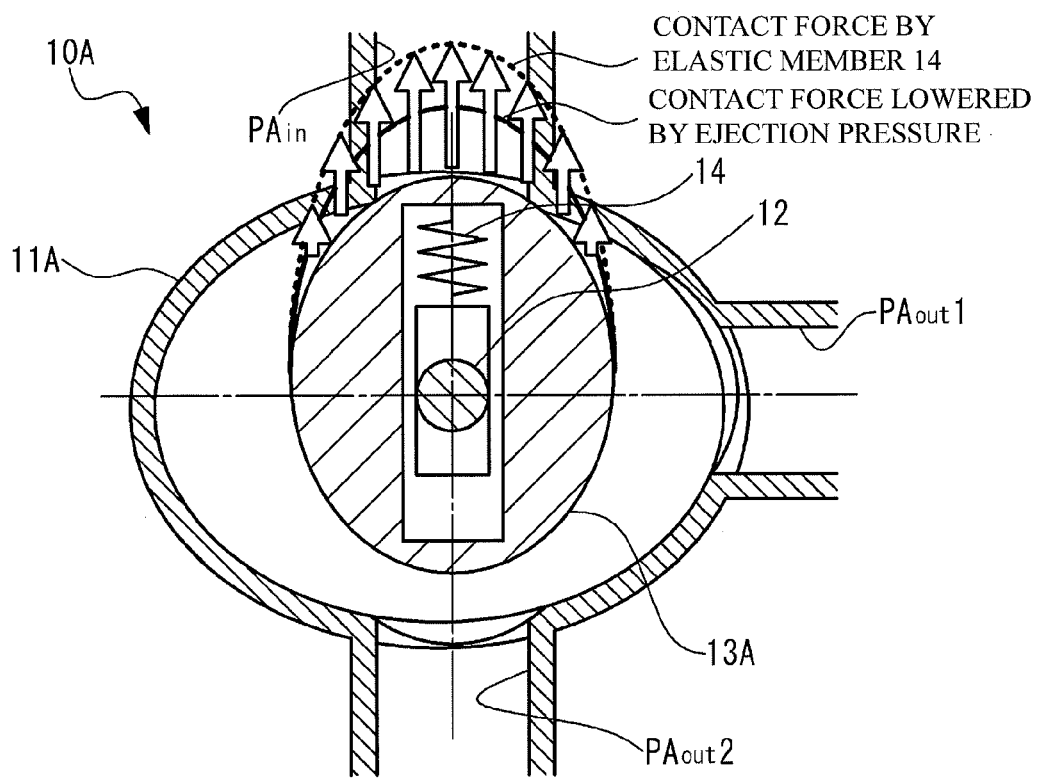
Figure 7A:
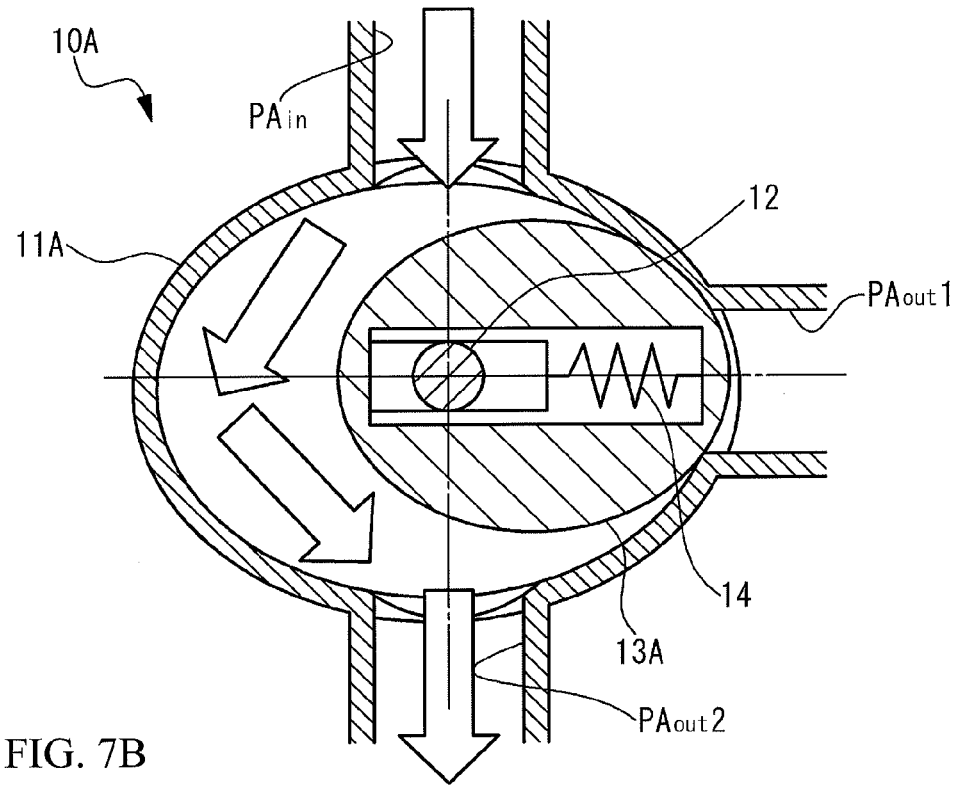
FIG. 7A and FIG. 7B illustrate a second figure of the explanatory diagram of the operation of the first embodiment.
Figure 7B:
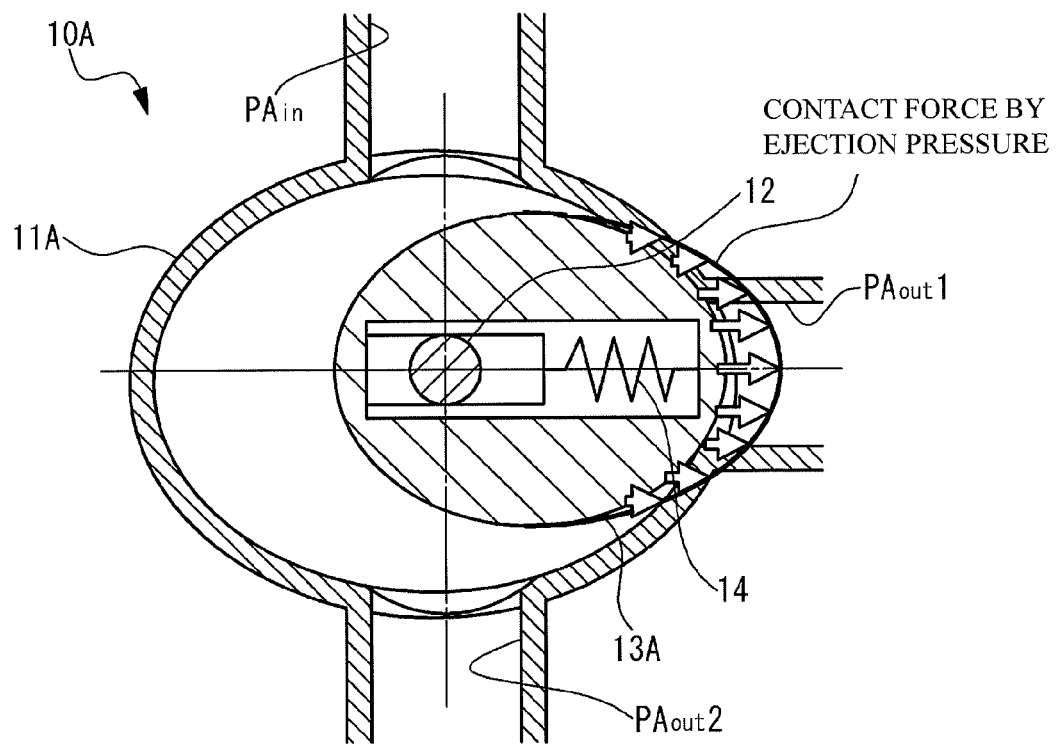
Figure 8A:
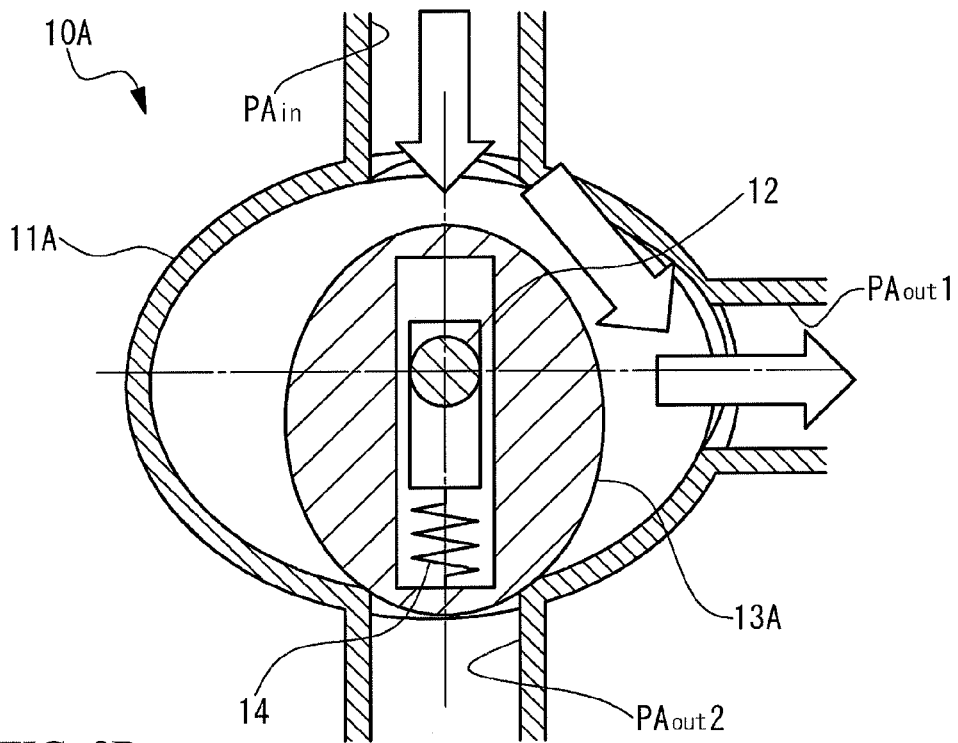
FIG. 8A and FIG. 8B illustrate a third figure of the explanatory diagram of the operation of the first embodiment.
Figure 8B:
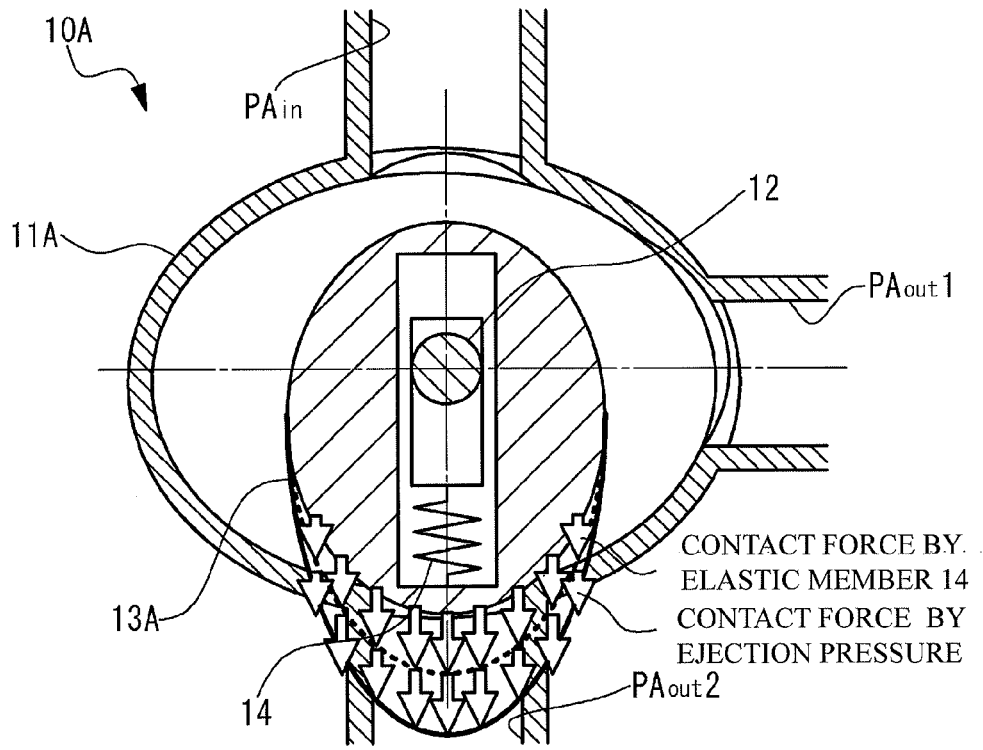

FIG. 6A, FIG. 6B, FIG. 7A, FIG. 7B, FIG. 8A and FIG. 8B are an explanatory diagram of the operation of the cooling control device 10A. FIG. 6A and FIG. 6B illustrate the cooling control device 10A at the water-stopping mode. FIG. 7A and FIG. 7B illustrate the cooling control device 10A at the block stagnation mode. FIG. 8A and FIG. 8B illustrate the cooling control device 10A at the all flow amount mode. In FIG. 6A through FIG. 8A, the circulation condition of the coolant water at each control mode is illustrated with an arrow. In FIG. 6B though 8B, the contact force of the sealing function portion 13A at each control mode is illustrated with an arrow.

As illustrated in FIG. 6A and FIG. 6B, the phase of the rotor 12 is controlled to a phase corresponding to the opening of the passage $PA_{in}$ at the water-stopping mode. In this case, the elastic member 14 biases the sealing function portion 13A toward the opening of the passage $PA_{in}$ in order to block the opening of the passage $PA_{in}$. At the water-stopping mode, when the coolant water is leaked from the passage $PA_{in}$, the heating promotion of the engine 2A may be largely degraded. A pressure of the coolant water (here, an ejection pressure of the W/P1) is applied to the sealing function portion 13A so that the opening of the passage $PA_{in}$ is released. Therefore, at the water-stopping mode, the elastic member 14 is in great need for preventing the leakage of the coolant water from the passage $PA_{in}$.

In contrast, the passage $PA_{in}$ is designed so that the distance from the rotation center of the rotor 12 to the opening is the smallest, compared to the passages $PA_{out}1$ and $PA_{out}2$. Thus, the elastic member 14 generates the strongest biasing force compared to a case where the elastic member 14 biases the sealing function portion 13A toward the openings of the passages $PA_{out}1$ and $PA_{out}2$, when the elastic member 14 biases the sealing function portion 13A toward the opening of the passage $PA_{in}$.

Therefore, the cooling control device 10A stops the circulation of the coolant water to the engine 2A by blocking the opening of the passage $PA_{in}$ with the sealing function portion 13A until the pressure of the applied coolant water reaches a predetermined pressure, even if the contact force of the sealing function portion 13A obtained by the elastic member 14 is reduced as illustrated in FIG. 6B. On the other hand, when the pressure of the applied coolant water reaches the predetermined pressure, an outflow of the coolant water via the passages $PA_{out}1$ and $PA_{out}2$ is allowed as illustrated with a dotted line in FIG. 6A by releasing the opening of the passage $PA_{in}$. Thus, the coolant water is circulated into the engine 2A urgently.

As illustrated in FIG. 7A and FIG. 7B, at the block stagnation mode, the phase of the rotor 12 is controlled to the phase corresponding to the opening of the passage $PA_{out}1$. In this case, the elastic member 14 biases the sealing function portion 13A to the opening of the passage $PA_{out}1$. Thereby, as illustrated in FIG. 7A, an outflow of the coolant water via the passage $PA_{out}2$ is allowed by blocking the opening of the passage $PA_{out}1$ with the sealing function portion 13A. Thereby, the circulation of the coolant water via the cylinder block 2a is stopped, and the circulation of the coolant water via the cylinder head 2b is allowed.

At the block stagnation mode, even if the coolant water is leaked to the passage $PA_{out}1$, the reliability of the engine 2A is not lost particularly. And, at the block stagnation mode, the pressure of the coolant water is applied to the sealing function portion 13A so that the opening of the passage $PA_{out}1$ is blocked. Therefore, at the block stagnation mode, necessity of the elastic member 14 is low when the leakage of the coolant water to the passage $PA_{out}1$ is prevented.

With respect to this case, the passage $PA_{out}1$ is designed so that the distance from the rotation center of the rotor 12 to the opening is the longest, compared to the passages $PA_{in}$ and $PA_{out}2$. Thereby, the elastic member 14 generates the weakest biasing force when biasing the sealing function portion 13A toward the opening of the passage $PA_{out}1$, compared to a case where the elastic member 14 biases the sealing function portion 13A to the openings of the passages $PA_{in}$ and $PA_{out}2$. As illustrated in FIG. 7B, at the block stagnation mode, the contact force of the sealing function portion 13A is obtained mainly by the pressure of the coolant water.

As illustrated in FIG. 8A and FIG. 8B, at the all flow amount mode, the phase of the rotor 12 is controlled to the phase corresponding to the opening of the passage $PA_{out}2$. In this case, the elastic member 14 biases the sealing function portion 13A toward the opening of the passage $PA_{out}2$. Thereby, as illustrated in FIG. 8A, an outflow of the coolant water via the passage $PA_{out}1$ is allowed by blocking the opening of the passage $PA_{out}2$ with the sealing function portion 13A. Thereby, the circulation of the coolant water via the cylinder block 2a and the cylinder head 2b is allowed.

At the all flow amount mode, when the coolant water is leaked to the passage $PA_{out}2$, the reliability of the engine 2A may be lost because the flow amount of the coolant water supplied to the cylinder block 2a is decreased. On the other hand, at the all flow amount mode, the pressure of the coolant water is applied to the sealing function portion 13A so that the opening of the passage $PA_{out}2$ is blocked. Therefore, at the all flow amount mode, the necessity of the elastic member 14 is higher than the passage $PA_{out}1$ and lower than the passage $PA_{in}$ when preventing the leakage of the coolant water to the passage $PA_{out}2$.

With respect to this case, the passage $PA_{out}2$ is designed so that the distance from the rotation center of the rotor 12 to the opening is longer than the passage $PA_{in}$ and shorter than the passage $PA_{out}1$. Thereby, the elastic member 14 generates a biasing force that is weaker compared to the case biasing the sealing function portion 13A toward the opening of the passage $PA_{in}$ and stronger compared to the case biasing the sealing function portion 13A toward the opening of the passage $PA_{out}1$ when biasing the sealing function portion 13A to the opening of the passage $PA_{out}2$. As illustrated in FIG. 8B, at the all flow amount mode, contact force of the sealing function portion 13A is obtained by the elastic member 14 and the pressure of the coolant water.

Figure 9:
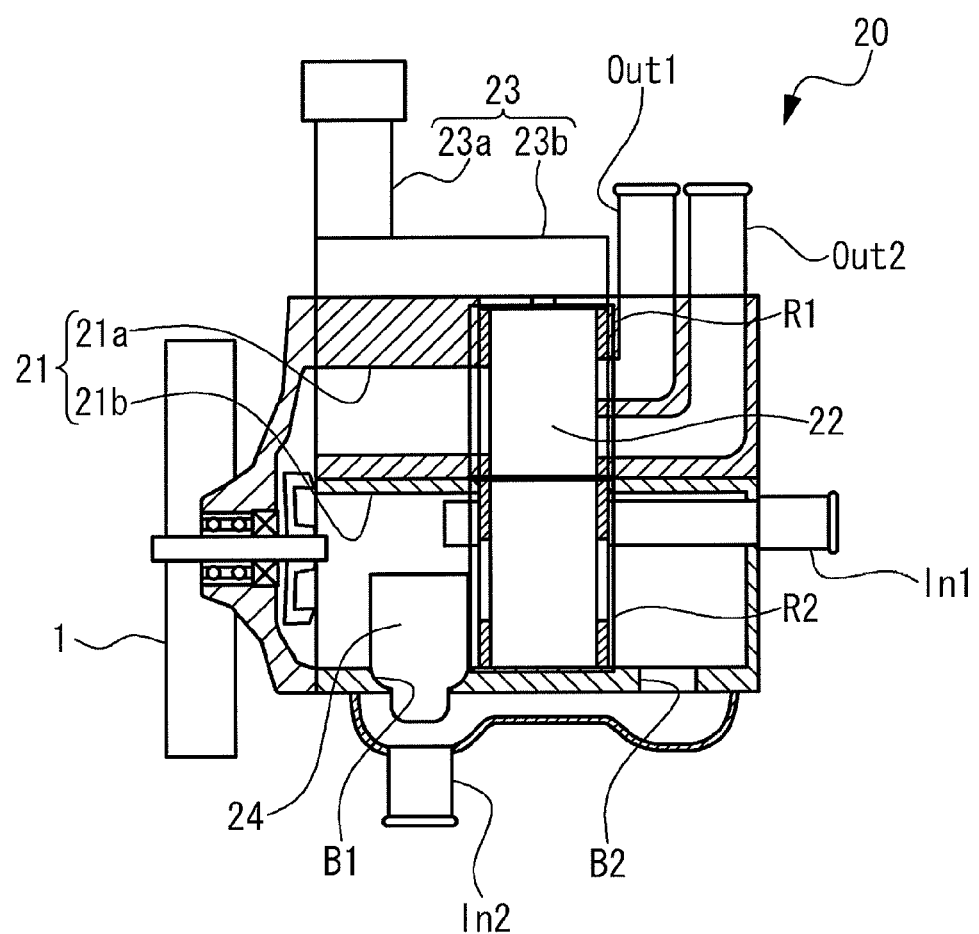
FIG. 9 illustrates a concrete example of the first embodiment.

FIG. 9 illustrates a concrete example of the cooling control device 10A. In concrete, the cooling control device 10A can be applied to the rotary valve 20 illustrated in FIG. 9. The rotary valve 20 has a housing portion 21, a rotor 22, a drive portion 23 and a thermostat 24. The housing portion 21 has a first passage 21a and a second passage 21b. And, the housing portion 21 has entrances In1 and In2 and exits Out1 and Out2. In FIG. 9, the W/P1 is illustrated in addition to the rotary valve 20.

The first passage 21a is coupled to a coolant water exit of the W/P 1. The coolant water is circulated from the coolant water exit. The second passage 21b is coupled to a coolant water entrance of the W/P 1. The coolant water is circulated to the coolant water entrance. The passages 21a and 21b are arranged in a row and are coupled to the W/P 1 via an edge. The W/P 1 side of the first passage 21a is an upstream side. The W/P 1 side of the second passage 21b is a downstream side.

The first passage 21a communicates with the exit portions Out1 and Out2 on the downstream side of the rotor 22. The second passage 21b communicates with the entrance In1 on the downstream side of the rotor 22. And, the second passage 21b communicates with the entrance In2 on the upstream side and the downstream side of the rotor 22. The second passage 21b has a first communication portion B1 communicating a part that is downstream compared to the rotor 22 with the entrance In2 and a second communication portion B2 communicating a part that is upstream compared to the rotor 22 with the entrance In2. In FIG. 9, the parts of the first communication portion 21a that are downstream compared to the rotor 22 and respectively communicate with the exit portions Out1 and Out2 are provided on the same phase, for convenience of illustrating. However, these parts are actually provided on different phases.

The rotor 22 is provided in the first passage 21a and the second passage 21b. The rotor 22 simultaneously controls the circulation of the coolant water circulating in the first passage 21a and the circulation of the coolant water circulating in the second passage 21b with a rotation operation. The rotor 22 has a first valving element R1 in the first passage 21a and a second valving element RF2 in the second passage 21b. The rotor 22 is capable of limiting of the circulation of the coolant water circulating in the first passage 21a and the coolant water circulating in the second passage 21b and canceling the limitation of the circulation.

The drive portion 23 has an actuator 32a and a gear box 23b and drives the rotor 22. In concrete, the actuator 23a is an electric motor. The actuator 23a may be a hydraulic actuator that is electronically controlled with a hydraulic control valve. The thermostat 24 is provided in a first communication portion B1. The thermostat 24 opens when the temperature of the coolant water is higher than a predetermined value, and closes when the temperature is equal to or less than the predetermined value.

In concrete, the cooling control device 10A can be applied as follows with respect to the above-mentioned rotary valve 20. That is, the passage Pain can be applied to a part of the first passage 21a that is upstream compared to the rotor 22. The passage $PA_{out}1$ can be applied to a part of the first passage 21a that is downstream compared to the rotor 22 and is formed by a part communicating with the exit portion Out1. The passage $PA_{out}2$ can be applied to a part of the first passage 21a that is downstream compared to the rotor 22 and is formed by a part communicating with the exit portion Out2.

In this case, the housing portion 11A can be applied to the housing portion 21 having the passages. The intermediate portion M can be applied to a part to which these passages open. The rotor 12 can be applied to the rotor 22 provided in the part to which these passages open. And, the sealing function portion 13A may be provided between the housing potion 21 and the first valving element R1, and the elastic member 14 may be provided between the first valving element R1 and the sealing function portion 13A, as described above. In this case, the thermostat 5 can be provided in the rotary valve 20 when the thermostat 5 is used as the thermostat 24.

With respect to the rotary valve 20, for example, the sealing function portion 13A may be provided between the housing portion 21 and the second valving element R2, and the elastic member 14 may be provided between the second valving element R2 and the sealing function portion 13A. In this case, the housing portion 21 structures a housing having two passages in which a part of the second passage 21b that is upstream compared to the rotor 22 acts as an entrance side passage, and a part of the second passage 21b that is downstream compared to the rotor 22 acts as an exit side passage. From one view of the present invention, the rotary valve 20 in which the sealing function portion 13A and the elastic member 14 are provided on the side of at least one of the valving elements R1 and R2 may be determined as a whole.

Next, a description will be given of a main function and effect of the cooling control device 10A. In the cooling control device 10A, the sealing function portion 13A is capable of rotating together with the rotor 12, and the elastic member 14 individually biases the sealing function portion 13A against the passages $PA_{in}$, $PA_{out}1$ and $PA_{out}2$ with respect to each different phase of the rotor 12. Therefore, the cooling control device 10A can perform a cooling control of the engine 2A by blocking the opening of one of the passages $PA_{in}$, $PA_{out}1$ and $PA_{out}2$ in accordance with the phase control of the rotor 12.

And, in the cooling control device 10A, the rotation center of the rotor 12 is located so that at least two of distances between the rotation center and the openings of the passages $PA_{in}$, $PA_{out}1$, and $PA_{out}2$ opening toward the intermediate portion M re different from each other from a view along the axis line C. Therefore, the cooling control device 10A can change the contact force of the sealing function portion 13A with respect to the passages $PA_{in}$, $PA_{out}1$ and $PA_{out}2$ having the different distances.

Thereby, the cooling control device 10A can preferably perform the cooling control of the engine 2A by securing an adequate sealing performance in a point that degradation of responsibility of the rotor 12 is suppressed and the sealing performance is secured. Thereby, friction of the sealing function portion 13A can be suppressed. And, it is possible to suppress degradation of cooling performance of the engine 2A caused by degradation of performance of the radiator 3 caused by abrasion powder intruding into the coolant water, by suppressing the friction of the sealing function portion 13A.

In the cooling control device 10A, the pressure of the coolant water can be applied so that the contact force of the sealing function portion 13A is reduced in a case where the elastic member 14 biases the sealing function portion 13A toward the opening of the passage Pain. Therefore, the cooling control device 10A can also preferably perform the cooling control of the engine 2A in a point that the responsibility of the rotor 12 can be improved during the high rotation operation of the engine 2A needing the cooling by reducing the contact force of the sealing function portion 13A in accordance with increasing of ejection pressure of the W/P1.

In the cooling control device 10A, when the elastic member 14 biases the sealing function portion 13A toward the opening of the passage $PA_{in}$, it is possible to stop the circulation of the coolant water into the engine 2A by blocking the opening of the passage $PA_{in}$ with the sealing function portion 13A and release the opening of the passage $PA_{in}$ when the pressure of the applied coolant water reaches a predetermined pressure until the pressure of the applied coolant water reaches the predetermined pressure, by applying the pressure of the coolant water so that the contact force of the sealing function portion 13A is reduced.

Therefore, the cooling control device 10A can urgently circulate the coolant water to the engine 2A without changing the phase of the rotor 12 when the pressure of the applied coolant water reaches the predetermined pressure. Thereby, it is possible to preferably perform the cooling control of the engine 2A in a point that overheat of the engine 2A can be preferably prevented when necessity of the cooling is rapidly enhanced as a result of sudden elevation of the rotation number of the engine 2A. And, it is possible to preferably perform the cooling control of the engine 2A in a point that breakdown of the drive portion 23 in the rotary valve 20 can be handled.

In the cooling control device 10A, the sealing function portion 13A has a contact portion E contacting at least one of the openings of the passages $PA_{in}$, $PA_{out}1$ and $PA_{out}2$. And, the sealing function portion 13A partially contacts the housing portion 11A by contacting one of the openings of the passages $PA_{in}$, $PA_{out}1$ and $PA_{out}2$ with the contact portion E. Therefore, the cooling control device 10A can preferably perform the cooling control of the engine 2A in a point that the responsibility of the rotor 12 can be improved because the sealing function portion 13A does not contact the housing portion 11A with a part other than the contact portion E.

The cooling control device 10A can apply the pressure of the coolant water so that the openings of the passages $PA_{in}$, $PA_{out}1$ and $PA_{out}2$ are opened or blocked when the sealing function portion 13A is provided as mentioned above and the cooling control device 10A has the following structure. That is, it is possible to apply the pressure of the coolant water toward the sealing function portion 13A so that the openings of the passages $PA_{in}$, $PA_{out}1$ and $PA_{out}2$ are opened or blocked when the sealing function portion 13A can slide with respect to the rotor 12 along a direction vertical to the axis line C and the elastic member 14 biases the sealing function portion 13A so as to slide the sealing function portion 13A with respect to the rotor 12.

When the pressure of the coolant water is always applied to the sealing function portion 13A so that the openings of the passages $PA_{in}$, $PA_{out}1$ and $PA_{out}2$ are blocked, a control mode is set so that the biasing force of the elastic member 14 needs the highest sealing performance and a torque for driving the rotor 12 at another control mode is excessive high. This results in degradation of the responsibility of the rotor 12.

With respect to this case, the cooling control device 10A reduces an average torque for driving the rotor 12 by applying the pressure of the coolant water so that the openings of the passages $PA_{in}$, $PA_{out}1$ and $PA_{out}2$ are opened or blocked, and thereby can improve the responsibility of the rotor 12, can suppress the friction of the sealing function portion 13A and reduce the burden of the actuator driving the rotor 12. Therefore, in concrete, the cooling control device 10A is preferable when having the structure mentioned above.

On the other hand, even if the cooling control device 10A has the above-mentioned structure, the responsibility of the rotor 12 is degraded in accordance with the pressure of the coolant water that is applied so that the openings of the passage $PA_{out}1$ and the passage $PA_{out}2$ are blocked with respect to the sealing function portion 13A. In the cooling control device 10A, the opening of the passage $PA_{out}2$ opens when the opening of the passage $PA_{out}1$ is blocked, and the opening of the passage $PA_{out}1$ opens when the opening of the passage $PA_{out}2$ is blocked.

Therefore, the cooling control device 10A can sufficiently suppress the degradation of the responsibility of the rotor 12 compared to the case where the outflow of the coolant water is perfectly blocked, even if the pressure of the coolant water is applied to the sealing function portion 13A so that the openings of the passage $PA_{out}1$ and the passage $PA_{out}2$ are blocked. Therefore, in concrete, it is preferable that the cooling control device 10A has a structure in which two or more exit passages (here, the passages $PA_{out}1$ and $PA_{out}2$) are provided in the housing portion 11A.

The cooling control device 10A has a plurality of rolling elements T located at four corners around the rotation center of the rotor 12 between the rotor 12 and the sealing function portion 13A from a view along the axis line C. Therefore, the cooling control device 10A can suppress the contact with the sealing function portion 13A under a condition that the rotor 12 is inclined along the rotation direction compared to the normal condition.

Thus, the cooling control device 10A can improve the changing responsibility of the sealing function portion 13A, and can suppress the contact friction between the rotor 12 and the sealing function portion 13A. Thus, the phase accuracy of the sealing function portion 13A can be improved when the phase detection error of the rotation angle sensor 30 is reduced.

In the cooling control device 10A, distances from the rotation center of the rotor 12 to the opening between the passages $PA_{in}$ and $PA_{out}1$ are different from each other because the inside shape of the intermediate portion M is ellipse. However, in this case, a curvature of the opening of the passages $PA_{in}$ and $PA_{out}1$ is different from each other from a view along the axis line C. When the rotation center of the rotor 12 is provided so that at least two of the distances between the rotation center and the openings of the passages $PA_{in}$, $PA_{out}1$ and $PA_{out}2$ are different from each other, the contacting of the sealing function portion 13A with respect to the opening may differ. Therefore, it is not always easy for the cooling control device 10A to seal the openings with the sealing function portion 13A.

With respect to this case, in the cooling control device 10A, at least one of the openings of the passages $PA_{in}$, $PA_{out}1$ and $PA_{out}2$ has a seal face S formed in accordance with the outer face shape of the contact portion E. Therefore, the cooling control device 10A can preferably secure the sealing performance of the openings of the passages $PA_{in}$, $PA_{out}1$ and $PA_{out}2$ in which at least two of curvatures of the openings and at least two of the contacting with the sealing function portion 13A are different from each other. It is preferable that the seal face S is provided in the opening of the passage $PA_{in}$ needing at least high sealing performance.

The cooling control device 10A can have the W/P 1 and the thermostat 5 as described in the rotary valve 20, when the cooling control device 10A is provided upstream with respect to the engine 2A. And, in this case, size enlargement can be suppressed, because it is not necessary to provide an exit side passage for outflowing the coolant water to the radiator 3. And, in this case, the circulation of the coolant water circulating in the first passage 21a and the circulation of the coolant water circulating in the second passage 21b can be controlled together with the rotation operation by using the rotor 12 as the rotor 22.

It is not easy to secure the responsibility of the rotor 22 because the rotor 22 controls the circulation of the coolant water circulating in the first passage 21*a* and the circulation of the coolant water circulating in the second passage 21*b* together with each other by the rotation operation. Therefore, it is preferable that the cooling control device 10A suppressing the degradation of the responsibility and securing the sealing performance of the rotor 12 uses the rotor 12 as the rotor 22 in concrete.

Second Embodiment

Figure 10:
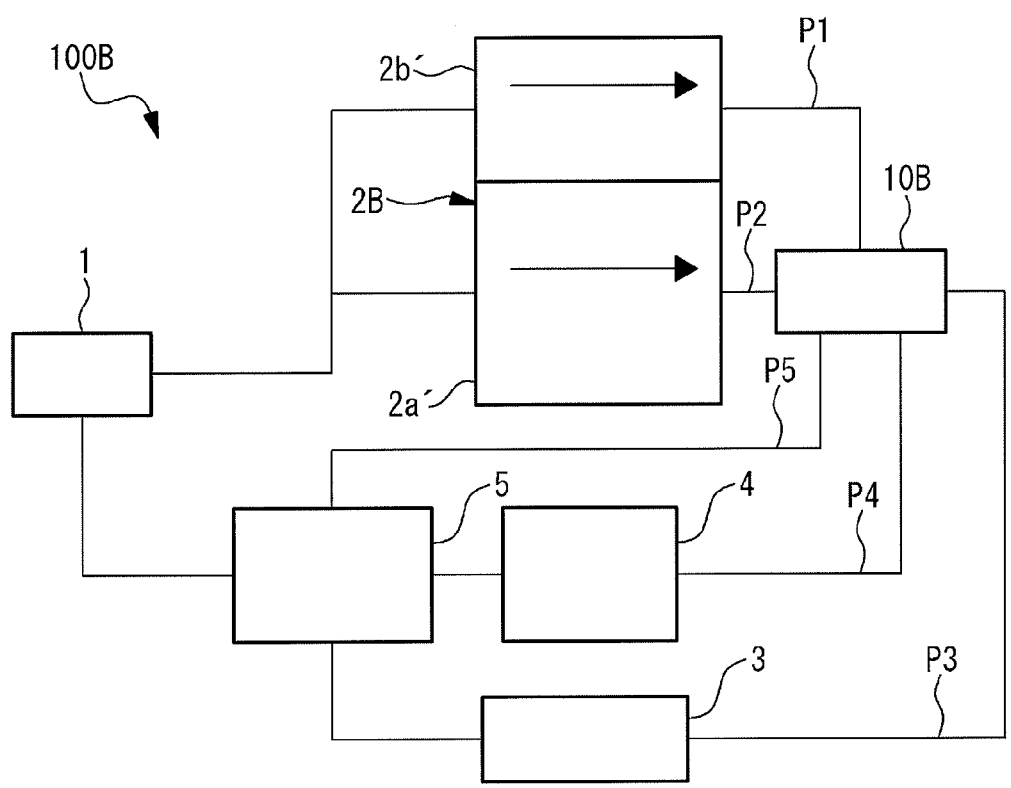
FIG. 10 illustrates an engine cooling circuit of a second embodiment.

FIG. 10 illustrates a cooling circuit 100B in which a cooling control device 10B is built. The cooling circuit 100B is substantially the same as the cooling circuit 100A except for points that the cooling control device 10B is provided instead of the cooling control device 10A, an engine 2B is provided instead of the engine 2A, and thereby the circulation passage is changed. The cooling control device 10B is substantially the same as the cooling control device 10A except for points that the cooling control device 10B is provided downstream with respect to the engine 2B and thereby the structure is changed. The structure of the cooling control device 10B will be described later in detail The engine 2B has a cylinder block 2*a*' and a cylinder head 2*b*' instead of the cylinder block 2*a* and the cylinder head 2*b*. The cylinder block 2*a*' and the cylinder head 2*b*' are substantially the same as the cylinder block 2*a* and the cylinder head 2*b* except for a point that a circulation route for circulating the coolant water individually is formed in the cylinder block 2A' and the cylinder head 2*b*'.

The circulation of the coolant water in the cooling circuit 100B is as follows. That is, the coolant water emitted by the W/P 1 is supplied to the cylinder block 2*a*' and the cylinder head 2*b*'. And, the coolant water having circulated in the cylinder head 2*b*' is individually supplied to the cooling control device 10B via the circulation route P1 coupling the cylinder head 2*b*' and the cooling control device 10B, and the coolant water having circulated in the cylinder block 2*a*' is individually supplied to the cooling control device 10B via the circulation route P2 coupling the cylinder block 2*a*' and the cooling control device 10B.

The coolant water is supplied to the radiator 3, the heater core 4 and the thermostat 5 from the cooling control device 10B via a circulation route P3 coupling the cooling control device 10B and the radiator 3, a circulation route P4 coupling the cooling control device 10B and the heater core 4 or a circulation route P5 coupling the cooling control device 10B and the thermostat 5. And, after that, the cooling water returns to the W/P 1 as in the case of the cooling circuit 100A.

When the cooling control of the engine 2B is performed in the cooling circuit 100B, in concrete, the cooling control device 10B performs the following circulation control of the coolant water. That is, at the water-stopping mode, inflowing of the coolant water from the circulation routes P1 and P2 is prohibited, and outflowing of the coolant water into the circulation routes P3, P4 and P5 is allowed. And, at the block stagnation mode, inflowing of the coolant water from the circulation route P2 is prohibited and the outflowing of the coolant water to the circulation route P1 is allowed. And, outflowing of the coolant water into the circulation routes P3, P4 and P5 is allowed.

On the other hand, at the all flow amount mode, the thermostat 5 performs a first high-temperature-water control for increasing the temperature of the coolant water and a first low-temperature-water control for decreasing the temperature of the coolant water. With respect to this case, at the all flow amount mode, the cooling control device 10B allows inflowing of the coolant water from the circulation routes P1 and P2 and allows outflowing of the coolant water into the circulation route P5 at the first high-temperature-water control and the first low-temperature-water control. And, at the all flow amount mode and the high-temperature-water control, outflowing of the coolant water at least into the circulation route P3 of the circulation routes P3 and P4 is limited. And, at the all amount flow mode and the first low-temperature-water control, limitation of the outflowing of the coolant water at least into the circulation route P3 of the circulation routes P3 and P4 is canceled.

Figure 11:
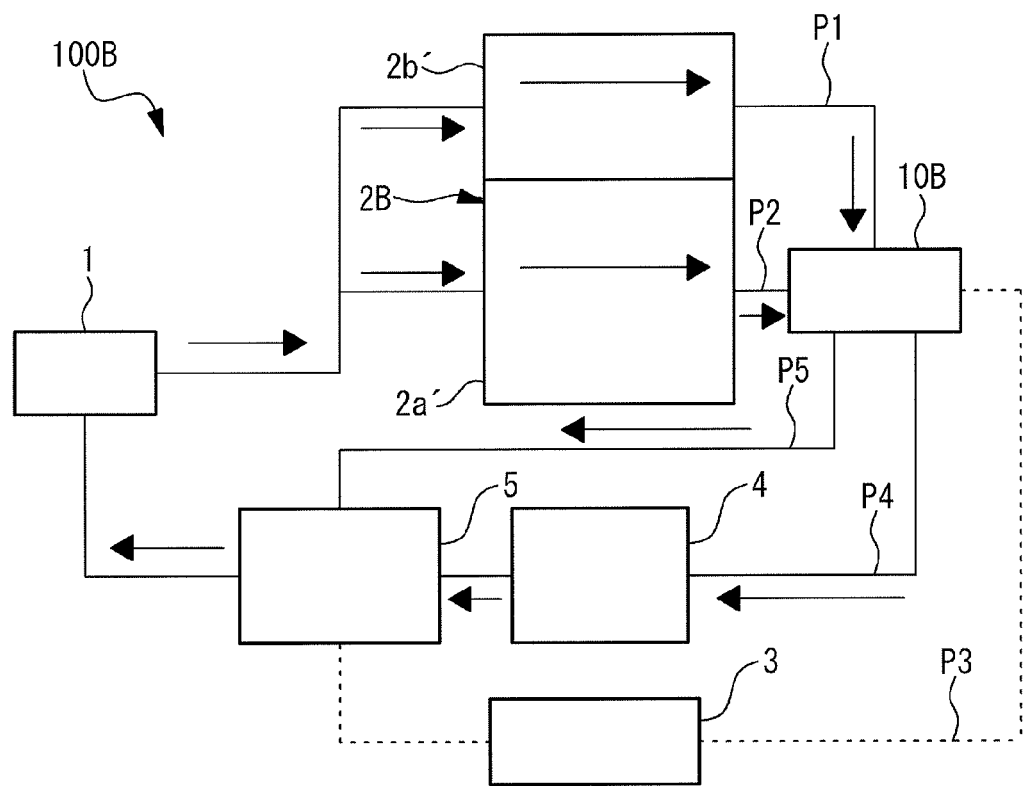
FIG. 11 illustrates a circulation of coolant water at a first high-temperature-water control.
Figure 12:
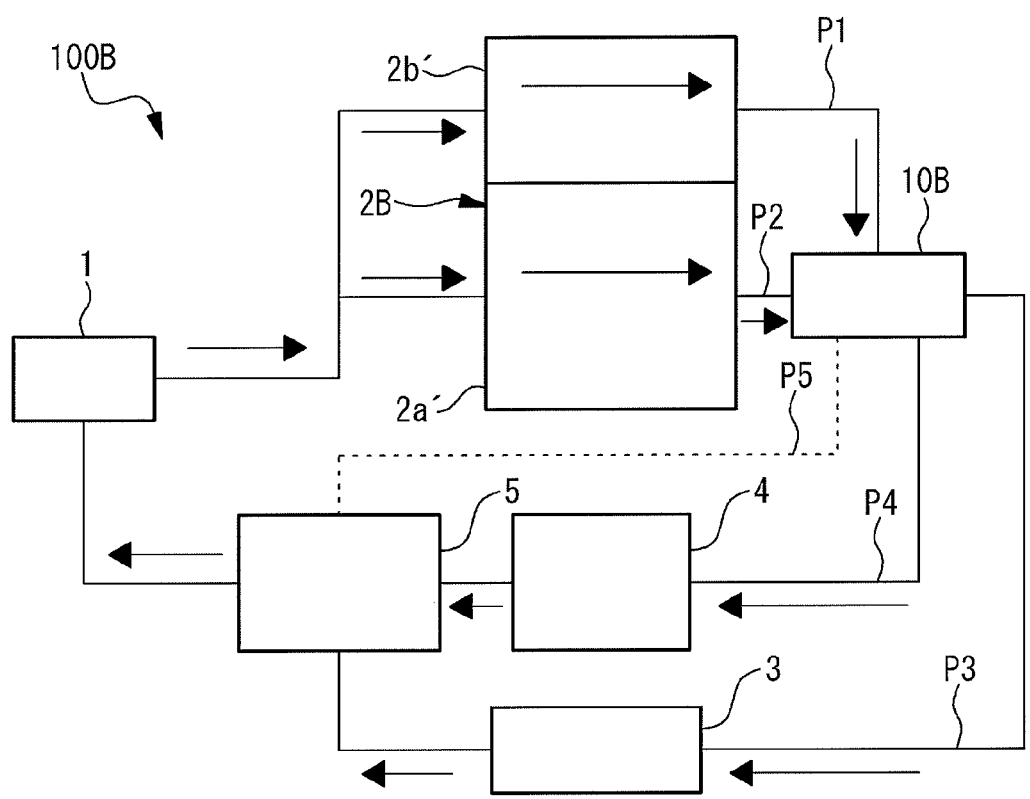
FIG. 12 illustrates a circulation of coolant water at a first low-temperature-water control.

FIG. 11 illustrates the circulation of the coolant water at the first high-temperature-water control. FIG. 12 illustrates the circulation of the coolant water at the low-temperature-water control. In FIG. 11 and FIG. 12, the flow of the coolant water is indicated with an arrow along the circulation route, and the circulation route in which the circulation is limited by the thermostat 5 or the cooling control device 10B is indicated with a broken line. In FIG. 11 and FIG. 12, the cooling control device 10B cancels the flow limitation of the coolant water with respect to the circulation route P4. The cooling control device 10B may limit outflowing of the coolant water into the circulation route P4 at the first high-temperature-water control and the first low-temperature-water control.

FIG. 11 illustrates a phase where the thermostat 5 limits inflowing of the coolant water from the radiator 3 and cancels limitation of inflowing of the coolant water from the cooling control device 10B when the temperature of the coolant water is less than the predetermined value α, and thereby the first high-temperature-water control is being performed. With respect to this case, the cooling control device 10B can continue increasing the temperature of the coolant water after the temperature of the coolant water excesses the predetermined value α by limiting outflowing of the coolant water to the circulation route P3 at the first high-temperature-water control.

FIG. 12 illustrates a phase where the thermostat 5 cancels the limitation of the inflowing of the coolant water from the radiator 3 and limits inflowing of the coolant water from the cooling control device 10B when the temperature of the coolant water is higher than the predetermined value α, and thereby the first low-temperature-water control is being performed. With respect to this case, the cooling control device 10B stops continuing increasing the temperature of the coolant water and decreasing the temperature of the coolant water by canceling the limitation of inflowing of the coolant water to the circulation route P3 at the first low-temperature-water control.

Therefore, the cooling control device 10B can perform a second high-temperature-water control for relatively increasing the temperature of the coolant water in an adequate temperature range and perform a second low-temperature-water control for relatively decreasing the temperature of the coolant water in an adequate temperature range at the all flow amount mode. In the cooling circuit 100B having the cooling control device 10B, the predetermined value α can be set to a lower limit of the adequate temperature.

Figure 13:
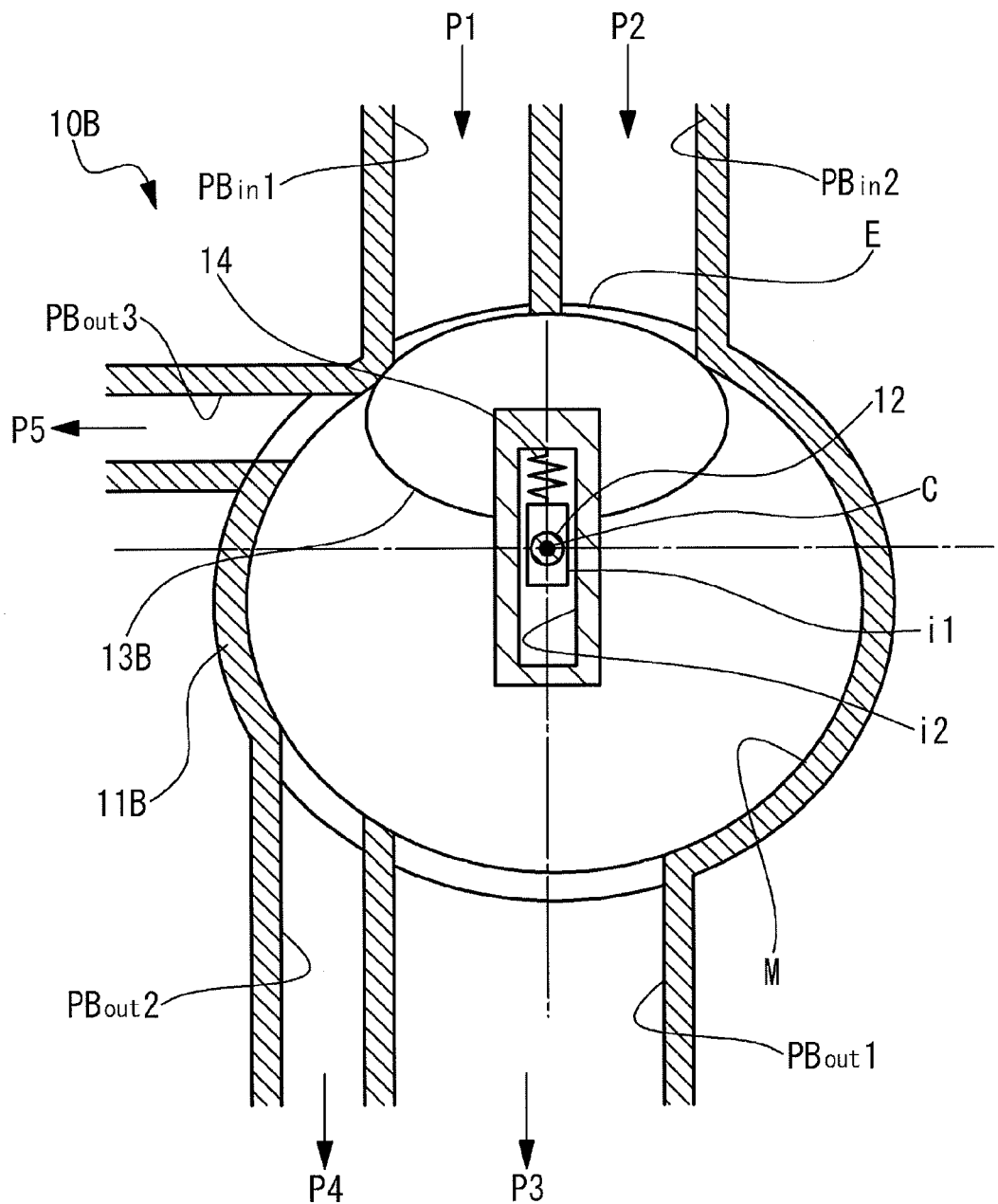
FIG. 13 illustrates an engine cooling control device of the second embodiment.

FIG. 13 illustrates the cooling control device 10B. The cooling control device 10B is substantially the same as the cooling control device 10A except for points that a housing portion 11B is provided instead of the housing portion 11A, and a sealing function portion 13B is provided instead of the sealing function portion 13A.

The housing portion 11B has a passage $PB_{in}1$ for inflowing the coolant water from the circulation route P1 and a passage $PB_{in}2$ for inflowing the coolant water from the circulation route P2 as an entrance passage. The housing portion 11B has a passage $PB_{out}1$ for outflowing the coolant water to the circulation route P3, a passage $PB_{out}2$ for circulating the coolant water to the circulation route P4, and a passage $PB_{out}3$ for circulating the coolant water to the circulation passage P5 as an exit passage. And, in the cooling control device 10B, these passages $PB_{in}1$, $PB_{in}2$, $PB_{out}1$, $PB_{out}2$, and $PB_{out}3$ act as a plurality of passages.

In concrete, the inside shape of the intermediate portion M of the housing portion 11B is an ellipse from a view along the axis line C. And, the passages $PB_{in}1$ and $PB_{in}2$ are provided so as to open toward the intermediate portion M from one edge side in a short axis of the inside shape under a condition where the passages $PB_{in}1$ and $PB_{in}2$ are adjacent each other from a view along the axis line C. In concrete, the passages $PB_{in}1$ and $PB_{in}2$ are provided so as to open toward the intermediate portion M under a condition where the passages $PB_{in}1$ and $PB_{in}2$ sandwiches the short axis of the inside shape and adjacent each other. The passages $PB_{in}1$ and $PB_{in}2$ extend along the short axis of the inside shape and open toward the intermediate portion M. A passage diameter are set so that a passage diameter of the passage $PB_{in}1$ is smaller than that of the passage $PB_{in}2$.

The passages $PB_{out}1$ and $PB_{out}2$ are provided so as to open toward the intermediate portion M from the other edge side of the short axis of the inside shape under a condition where the passages $PB_{out}1$ and $PB_{out}2$ are adjacent each other from a view along the axis line C. And, the passage $PB_{out}1$ is provided so as to open toward the intermediate portion M in accordance with the short axis of the inside shape. And, the passage $PB_{out}2$ is provided so as to open toward the intermediate portion M at a position shifted ahead from the short axis of the inside shape in the rotation direction of the rotor 12. The passages $PB_{out}1$ and $PB_{out}2$ extend along the short axis of the inside shape, and opens toward the intermediate portion M. A passage diameter is set so that a passage diameter of the passage $PB_{out}2$ is smaller than that of the passage $PB_{out}1$.

The passage $PB_{out}3$ is provided so as to open toward the intermediate portion M from one edge side of a long axis of the inside shape from a view along the axis line C. And, the passage $PB_{out}3$ is provided so as to open toward the intermediate portion M at a position shifted ahead from the long axis of the inside shape in the rotation direction of the rotor 12. The passage $PB_{out}3$ extends along the long axis of the inside shape, and opens toward the intermediate portion M. The passages $PB_{in}1$, $PB_{in}2$, $B_{out}1$, $PB_{out}2$ and $PB_{out}3$ are provided in this order along the rotation direction of the rotor 12.

On the other hand, the rotation center of the rotor 12 is set to a position shifted toward the passages $PB_{in}1$ and $PB_{in}2$ side from the ellipse center of the inside shape from a view along the axis line C. And thereby, the distances between the openings of the passages $PB_{in}1$ and $PB_{in}2$ and the rotation center of the rotor 12 are shorter than the distances between the openings of the passages $PB_{out}1$ and $PB_{out}2$ and the rotation center of the rotor 12.

Between the passages $PB_{in}1$ and $PB_{in}2$, the distance between the opening of the passage $PB_{in}1$ and the rotation center of the rotor 12 is shorter than the distance between the opening of the passage $PB_{in}2$ and the rotation center of the rotor 12. Between the passages $PB_{out}1$ and $PB_{out}2$, the distance between the opening of the passage $PB_{out}1$ and the rotation center of the rotor 12 is shorter than the distance between the opening of the passage $PB_{out}2$ and the rotation center of the rotor 12. The passage $PB_{out}3$ is provided so that the distance between the opening and the rotation center of the rotor 12 is different from the distances between the openings of the passages $PB_{in}1$, $PB_{in}2$, $PB_{out}1$ and $PB_{out}2$ and the rotation center of the rotor 12. And, in the cooling control device 10B, the rotation center of the rotor 12 is set so that the distances between the openings of the passages $PB_{in}1$, $PB_{in}2$, $PB_{out}1$, $PB_{out}2$ and $PB_{out}3$ and the rotation center of the rotor 12 are different from each other.

The sealing function portion 13B is substantially the same as the sealing function portion 13A except for points that a part positioned on one edge side in the short axis of the outside shape of an ellipse acts as the contact portion E, a sliding wall of the engagement portion i2 is provided along the short axis of the outside shape, and thereby the engagement portion i2 is provided so as to project from the other edge side along the short axis direction of the outside shape.

In the cooling control device 10B, the contact portion E contacts the opening of at least one of the passages $PB_{in}1$, $PB_{in}2$, $PB_{out}1$, $PB_{out}2$ and $PB_{out}3$. In the cooling control device 10B, a movable range of the sealing function portion 13B is set so that the contact portion E can contact the opening portions of the passages $PB_{in}1$ and $PB_{in}2$ of the passages $PB_{in}1$, $PB_{in}2$, $PB_{out}1$, $PB_{out}2$ and $OB_{out}3$.

On the other hand, in the cooling control device 10B, there is a space between the sealing function portion 13B and the openings of the passages $PB_{out}1$ and $PB_{out}2$ under a condition where the elastic member 14 biases the sealing function portion 13B toward the openings of the passages $PB_{out}1$ and $PB_{out}2$ acting as a predetermined passage of the passages $PB_{in}1$, $PB_{in}2$, $PB_{out}1$, $PB_{out}2$ and $PB_{out}3$. The space is provided in an interval range acting as a squeezing.

With respect to the passages $PB_{in}1$ and $PB_{in}2$ of which openings are adjacent each other, in the cooling control device 10B, in concrete, the sealing function portion 13B can simultaneously contact the openings of the passages $PB_{in}1$ and $PB_{in}2$ when the elastic member 14 biases the sealing function portion 13B toward the whole of the openings of the passages $PB_{in}1$ and $PB_{in}2$. And, when the elastic member 14 individually biases the sealing function portion 13B toward at least the opening of the passage $PB_{in}2$ of the passages $PB_{in}1$ and $PB_{in}2$, the sealing function portion 13B can individually contact at least the opening of the passage $PB_{in}2$ of the passages $PB_{in}1$ and $PB_{in}2$.

With respect to the passages $PB_{out}1$ and $PB_{out}2$ of which openings are adjacent each other, in the cooling control device 10B, in concrete, a space simultaneously appears between the sealing function portion 13B and the openings of the passages $PB_{out}1$ and $PB_{out}2$ when the elastic member 14 biases the sealing function portion 13B toward the whole of the openings of the passages $PBput1$ and $PB_{out}2$. And a space individually appears between the sealing function portion 13B and the openings of the passages $PB_{in}1$ and $PB_{in}2$ when the elastic member 14 individually biases the sealing function portion 13B toward the openings of the passages $PB_{in}1$ and $PB_{in}2$.

In the cooling control device 10B, the rotation center of the rotor 12 is set so that distances between the rotation center of the rotor 12 and the whole of the adjacent openings of the passages $PB_{in}1$ and $PB_{in}2$, distances between the rotation center of the rotor 12 and the whole of the adjacent openings of the passages $PB_{out}1$ and $PB_{out}2$, and the distances between the rotation center of the rotor 12 and the openings of the passages $PB_{in}1$, $Pb_{in}2$, $PB_{out}1$, $PB_{out}2$ and $PB_{out}3$ are different from each other.

Figure 14A:
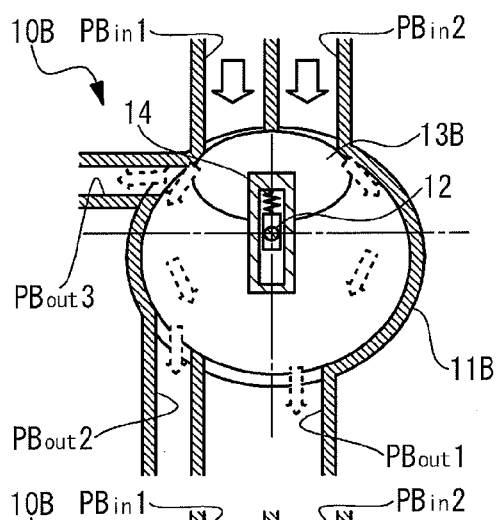
FIG. 14A to FIG. 14F illustrate an explanatory diagram of an operation of the second embodiment.
Figure 14B:
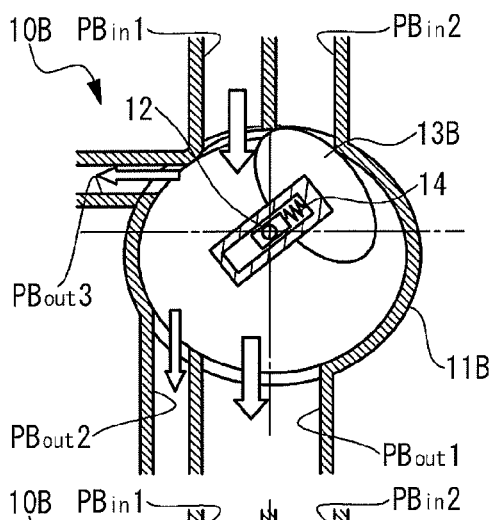
Figure 14C:
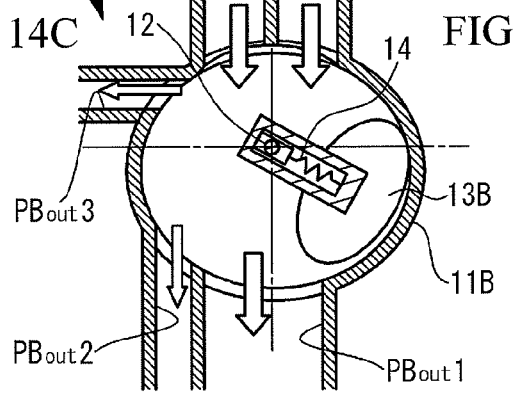
Figure 14D:
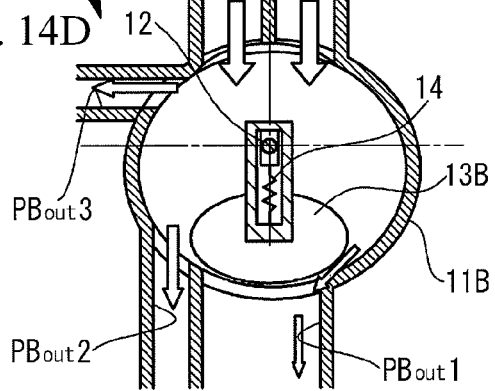
Figure 14E:
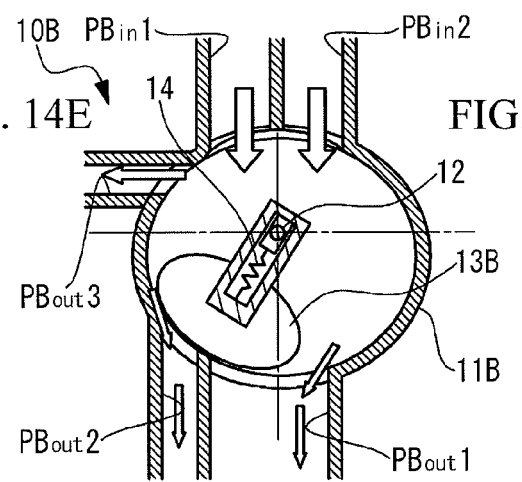
Figure 14F:
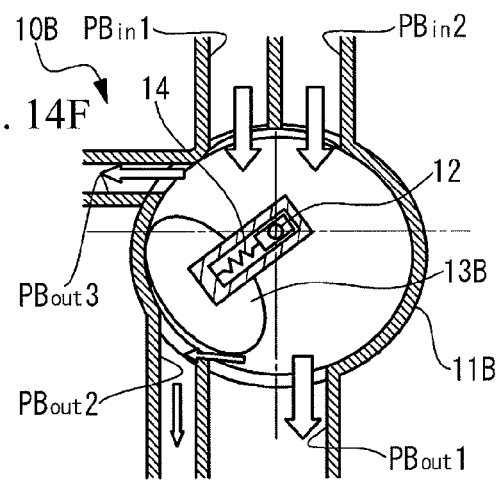

FIG. 14A to FIG. 14F illustrate an explanation diagram of the operation of the cooling control device 10B. FIG. 14A illustrates the cooling control device 10B at the water-stopping mode. FIG. 14B illustrates the cooling control device 10B at the block stagnation mode. FIG. 14C illustrates the cooling control device 10B at the all flow amount mode and the first low-temperature-water control. FIG. 14D illustrates the cooling control device 10B at the all flow amount mode and at the first high-temperature-water control. FIG. 14E illustrates the cooling control device 10B at the all flow amount mode, the high-temperature-water control and a burden-reduction control of an air conditioner. FIG. 14F illustrates the cooling control device 10B at the all flow amount mode, the first low-temperature-water control and the burden-reduction control of the air conditioner. The burden-reduction control of the air conditioner is a control for reducing the burden of the air conditioner acting as a cooler As illustrated in FIG. 14A, at the water-stopping mode, the phase of the rotor 12 is controlled to a phase corresponding to the whole of the openings of the adjacent passages $PB_{in}1$ and $PB_{in}2$. In this case, the elastic member 14 biases the sealing function portion 13B toward the whole of the openings of the passages $PB_{in}1$ and $PB_{in}2$. On the other hand, the high pressure of the coolant water is applied to the sealing function portion 13B so that the whole of the openings of the passages $PB_{in}1$ and $PB_{in}2$ opens during a high rotation operation of the engine 2B. With respect to this case, the passages $PB_{in}1$ and $PB_{in}2$ are set so that the distance between the rotation center of the rotor 12 and the whole of the openings of the passages $PB_{in}1$ and $PB_{in}2$ are the shortest compared to the distances between the rotation center of the rotor 12 and the openings of the individual passages $PB_{in}1$ and $PB_{in}2$ and the other passages $PB_{out}1$, $PB_{out}2$ and $PB_{out}3$.

Thus, the elastic member 14 generates the strongest bias force when biasing the sealing function portion 13B toward the whole of the openings of the passages $PB_{in}1$ and $PB_{in}2$. The cooling control device 10B stops the circulation of the coolant water via the engine 2B by blocking the whole of the openings of the passages $PB_{in}1$ and $PB_{in}2$ until the applied pressure of the coolant water reaches a predetermined pressure. On the other hand, when the applied pressure of the coolant water reaches the predetermined pressure, outflowing of the coolant water via the passages $PB_{out}1$, $PB_{out}2$ and $PB_{out}3$ is allowed as illustrated with a dotted arrow, by opening the whole of the openings of the passages $PB_{in}1$ and $PB_{in}2$. Thus, the circulation of the coolant water via the engine 2B is urgently allowed.

As illustrated in FIG. 14B, at the block stagnation mode, the phase of the rotor 12 is controlled to a phase individually corresponding to the opening of the passage $PB_{in}2$. In this case, the elastic member 14 individually biases the sealing function portion 13B toward the opening of the passage $PB_{in}2$. Thus, inflowing of the coolant water via the passage $PB_{in}1$ and outflowing of the coolant water via the passages $PB_{out}1$, $PB_{out}2$ and $PB_{out}3$ are allowed by individually blocking the opening of the passage $PB_{in}2$ with the sealing function portion 13B. Thereby, the circulation of the coolant water via the cylinder block 2a' is stopped, and the circulation of the coolant water via the cylinder head 2b' is allowed.

On the other hand, at the block stagnation mode, the pressure of the coolant water is applied to the sealing function portion 13B so that the opening of the passage $PB_{in}2$ opens. With respect to this case, the distance between the rotation center of the rotor 12 and the opening of the passage $PB_{in}2$ is longer than the distance between the rotation center of the rotor 12 and the opening of the passage $PB_{in}1$ and is shorter than the distances between the rotation center of the rotor 12 and the openings of the passages $PB_{out}1$, $PB_{out}2$ and $PB_{out}3$. Thus, the elastic member 14 generates the strongest biasing force between the control modes next to the case of biasing the sealing function portion 13B toward the whole of the openings of the passages $PB_{in}1$ and $PB_{in}2$.

As illustrated in FIG. 14C, at the all flow amount mode and the first low-temperature-water control, the phase of the rotor 12 is controlled to a phase not corresponding to the openings of the passages $PB_{in}1$, $PB_{in}2$, $PB_{out}1$, $PB_{out}2$ and $PB_{out}3$. Thus, the circulation of the coolant water via the cylinder block 2a' and the cylinder head 2b' is allowed. In this case, in concrete, the rotor 12 is controlled to face with a part before the passage $PB_{in}2$ and after the passage $PB_{out}1$ of the housing portion 11B in the rotation direction of the rotor 12.

The distance between the part and the rotation center of the rotor 12 is longer than the distances between the rotation center of the rotor 12 and the openings of the passages $PB_{in}1$, $PB_{in}2$ and $PB_{out}3$ and shorter than the distances between the rotation center of the rotor 12 and the openings of the passages $PB_{out}1$ and $PB_{out}2$. Thus, the elastic member 14 reduces the contact force of the sealing function portion 13B by generating biasing force weaker than the case of biasing toward the opening of the passage $PB_{in}2$ when biasing the sealing function portion 13B toward the part.

As illustrated in FIG. 14D, at the all flow amount mode and the first high-temperature-water control, the phase of the rotor 12 is controlled to a phase individually corresponding to the opening of the passage $PB_{out}1$. In this case, the elastic member 14 individually biases the sealing function portion 13B toward the opening of the passage $PB_{out}1$. Thereby, outflowing of the coolant water via the passage $PB_{out}1$ is individually limited by individually providing a space between the sealing function portion 13B and the opening of the passage $PB_{out}1$. The distance between the opening of the passage $PB_{out}1$ and the rotation center of the rotor 12 is longer than the distance where the sealing function portion 13B reaches a movable limit.

As illustrated in FIG. 14E, at the all flow amount mode, the first high-temperature-water control and the burden-reduction control of the air conditioner, the phase of the rotor 12 is controlled to a phase corresponding to the whole of the openings of the adjacent passages $PB_{out}1$ and $PB_{out}2$. In this case, the elastic member 14 biases the sealing function portion 13B toward the whole of the openings of the passages $PB_{out}1$ and $PB_{out}2$. Thus, outflowing of the coolant water via the passages $PB_{out}1$ and $PB_{out}2$ are simultaneously limited by providing a space between the sealing function portion 13B and the openings of the passages $PB_{out}1$ and $PB_{out}2$. The distance between the rotation center of the rotor 12 and the whole of the openings of the passages $PB_{out}1$ and $PB_{out}2$ is longer than the distance where the sealing function portion 13B reaches a movable limit.

As illustrated in FIG. 14F, at the all flow amount mode, the first low-temperature-water control, and the burden-reduction control of the air conditioner, the phase of the rotor 12 is controlled to a phase individually corresponding to the opening of the passage $PB_{out}2$. In this case, the elastic member 14 individually biases the sealing function portion 13B toward the opening of the passage $PB_{out}2$. Thus, outflowing of the coolant water via the passage $PB_{out}2$ is individually limited by individually providing a space between the sealing function portion 13B and the opening of the passage $PB_{out}2$.

The distance between the rotation center of the rotor 12 and the whole of the opening of the passage $PB_{out}2$ is longer than the distance where the sealing function portion 13B reaches a movable limit. With respect to the passage $PB_{out}2$, the cooling control device 10B can individually make a space between the sealing function portion 13B and the opening of the passage $PB_{out}2$ by contacting the sealing function portion 13B to a front part of the passage $PB_{out}2$ in the housing portion 11B in the rotation direction of the rotor 12.

Next, a description will be given of a main function and effect of the cooling control device 10B. In the cooling control device 10B, a space can be made between the sealing function portion 13B and the openings of the passages $PB_{out}1$ and $PB_{out}2$ under a condition that the elastic member 14 biases the sealing function portion 13B to the openings of the passages $PB_{out}1$ and $PB_{out}2$ that are a predetermined passage, compared to the cooling control device 10A. Therefore, the cooling control device 10B can allow the circulation of a small amount of the coolant water instead of stopping the circulation of the coolant water via the passages $PB_{out}1$ and $PB_{out}2$. And, thus, it is possible to improve the responsibility of the rotor 12 by preventing the contact with the housing portion 11B.

The cooling control device 10B can have the following effect by using the passage $PB_{out}1$ outflowing the coolant water supplied to the radiator 3 as the predetermined passage. That is, when the coolant water is not circulated to the radiator 3, the temperature of the coolant water tends to increase at the all flow amount mode and the first high-temperature-water control. Therefore, a switching frequency of the water temperature control between the first low-temperature-water control and the first high-temperature-water control gets higher. Therefore, the life of the thermostat tends to gets shorter.

And, when the coolant water is not circulated to the radiator 3, the temperature of the coolant water stored in the radiator 3 tends to get lower at the all flow amount mode and the first high-temperature-water control. Therefore, in this case, low-temperature coolant water is urgently supplied to the engine 2B when the temperature control is switched from the first high-temperature-water control to the first low-temperature-water control. Thus, large thermal stress occurs in the engine 2B, and thermal distortion occurs. Therefore, coolant water leakage and oil leakage may occur in the engine 2B.

With respect to this case, the cooling control device 10B can supply a small amount of the coolant water to the radiator 3 at the all flow mount mode and the first high-temperature-water control by using the passage $PB_{out}1$ as the predetermined passage. Therefore, the cooling control device 10B can improve the life of the thermostat 5 by reducing the switching frequency of the water temperature control. And it is possible to improve the reliability of the engine 2B by preventing the occurrence of the large thermal stress in the engine 2B when the temperature control is switched from the first high-temperature-water control to the first low-temperature-water control.

The cooling control device 10B can limit inflowing of the high-temperature coolant water from the engine 2B to the heater core 4 at the all flow amount mode by using the passage PBput2 for outflowing the coolant water supplied to the heater core 4 as the predetermined passage. Thus, it is possible to reduce the burden of the air conditioner during the operation as a cooler using the heater core 4. Thereby, effect of reduction of fuel consumption can be achieved.

The cooling control device 10B can improve mounting on a vehicle instead of providing the W/P 1 and the thermostat 5 when the cooling control device 10B is provided downstream of the engine 2B. And, a second high-temperature-water control for relatively increasing the temperature of the coolant water in an adequate temperature range and a second low-temperature-water control for relatively decreasing the temperature of the coolant water in the adequate temperature range can be performed at the all flow amount mode. And, the circulation control of the coolant water with respect to another structure such as the heater core 4 can be performed in addition to the engine 2B.

The cooling control device 10B can preferably switch the cooling control of the engine 2B between the water-stopping mode, the block stagnation mode and the all flow amount mode by making the openings of the passages $PB_{in}1$ and $PB_{in}2$ act as adjacent openings of the passages $PB_{in}1$ and $PB_{in}2$. And an execution and stop of the burden-reduction control of the air condition at the first high-temperature-water control can be preferably switched by making the openings of the passages $PB_{out}1$ and $PB_{out}2$ act as adjacent openings, when the execution and stop of the burden reduction of the air conditioner can be switched at the first high-temperature-water control and the first low-temperature-water control.

Third Embodiment

Figure 15:
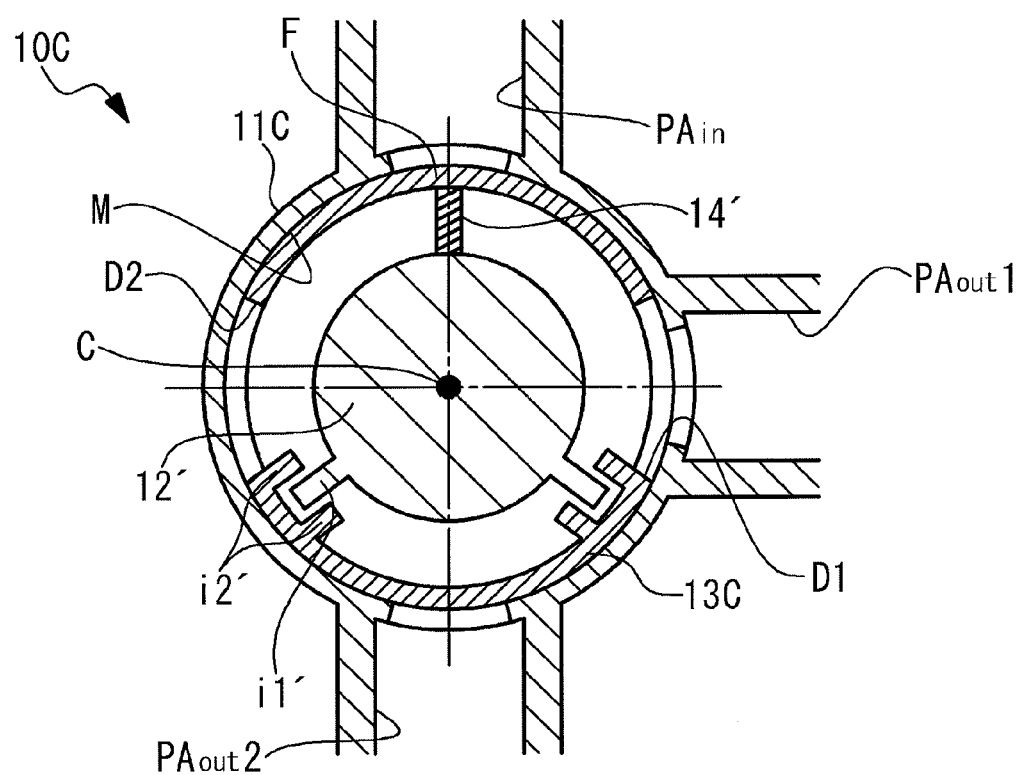
FIG. 15 illustrates an engine cooling control device of a third embodiment.

FIG. 15 illustrates a cooling control device 10C. The cooling control device 10C is substantially the same as the cooling control device 10A except for points that a housing portion 11C is provided instead of the housing portion 11A, a rotor 12' is provided instead of the rotor 12, a sealing function portion 13C is provided instead of the sealing function portion 13A, and an elastic member 14' is provided instead of the elastic member 14. The cooling control device 10C can be provided in the cooling circuit 100A instead of the cooling control device 10A, and can be applied to the rotary valve 20 as in the case of the cooling control device 10A.

The housing portion 11C is substantially the same as the housing portion 1A except for a point that the inside shape of the intermediate portion M is a circle shape from a view along the axis line C. In the housing portion 11C, the long axis is not distinguished from the short axis in the inside shape. Therefore, the passages $PA_{in}$, $PA_{out}1$ and $PA_{out}2$ are provided in accordance with two diameter axes of the inside shape at a right angle.

The rotor 12' is substantially the same as the rotor 12 except for points that the rotation center of the rotor 12' is provided in accordance with the center of the inside shape of the intermediate portion M from a view along the axis line C, an engagement portion i1' is provided instead of the engagement portion i1, and the thickness of the valving element of the rotor 12' is different from that of the valving element of the rotor 12. The thickness of the valving element of the rotor 12' may not be different from that of the valving element of the rotor 12. The engagement portion i1' projects toward outer in a diameter direction from the valving element.

The sealing function portion 13C is provided between the housing portion 11C and the rotor 12' and can rotate together with the rotor 12' as in the case of the sealing function portion 13A, and is structured with a sealing member as in the case of the sealing function portion 13A. On the other hand, the sealing function portion 13C has a different structure from the sealing function portion 13A in a point of the following structure.

That is, the sealing function portion 13C has a circular cylinder shape of which shape becomes a circular shape from a view along the axis line C and has an openings D1 and D2 at a circumference. And, an engagement portion i2' is provided instead of the engagement portion i2. The openings D1 and D2 will be described later.

The engagement portion i2' projects toward inside in a diameter direction from the circumference of the sealing function portion 13C. The engagement portion i2' is provided according to the engagement portion i1' and sandwiches the engagement portion i1' along a circumference direction from a view along the axis line C. There are provided a plurality of pairs (here, two pairs) of the engagement portions i1' and i2' engaging with each other. The engagement portions i1' and i2' limit the relative movement of the sealing function portion 13C along the rotation direction with respect to the rotor 12' under a condition where the engagement portions i1' and i2' engage with each other.

The sealing function portion 13C is concentrically located with the rotor 12' under a condition where the engagement portions i1' and i2' engage with each other. The sealing function portion 13C can rotate together with the rotor 12' by the engagement portions i1' and i2'. On the other hand, the sealing function portion 13C is different from the sealing function portion 13A in a point that the sealing function portion 13C cannot slide along a direction vertical to the axis line C with respect to the rotor 12'. The engagement portions i1' and i2' may be provided to allow the displacement of the sealing function portion 13C along the direction vertical to the axis line C under the condition where the engagement portions i1' and i2' engage with each other.

The elastic member 14' biases the sealing function portion 13C to at least the opening of the passage $PA_{in}$ of the passages $PA_{in}$, $PA_{out}1$ and $PA_{out}2$ in accordance with the phase control of the rotor 12' so that the sealing function portion 13C contacts the opening. With respect to this point, the elastic member 14' is similar to the elastic member 14. On the other hand, the elastic member 14' has a different structure from the elastic member 14 in a point that the elastic member 14' does not bias the sealing function portion 13C individually at every phase of the rotor 12' with respect to the passages $PA_{in}$, $PA_{out}1$ and $PA_{out}2$ in the phase control of the rotor 12'. This point will be described later.

A biased portion F that is a part of the sealing function portion 13C to which the elastic member 14' biases is pressed to the intermediate portion M by the biasing force of the elastic member 14'. The sealing function portion 13C has the opening D1 facing with the opening of the passage $PA_{out}1$ at a phase condition where the biased portion F faces with the opening of the passage $PA_{in}$. And, the sealing function portion 13C has the opening D2 facing with the opening of the passage $PA_{out}2$ under a condition where the opening D1 faces with the opening of the passage $PA_{in}$.

The sealing function portion 13C structured as mentioned above contacts the intermediate portion M at the biased portion F under the function of the elastic member 14' and contacts the intermediate portion M at another part other than the biased portion F because of thermal expansion when the temperature of the sealing function portion 13C is higher than a predetermined temperature. The predetermined temperature may be optional. The predetermined temperature may be set to a temperature so that another part contacts the intermediate portion M at least in a usage temperature range. In this case, the elastic member 14' may be structured so as to press the biased portion F to the intermediate portion M by deforming or displacing the sealing function portion 13C even if the temperature of the elastic member 14' is less than the predetermined temperature. The predetermined temperature may be set to a temperature at which another part always contacts the intermediate portion M in the usage temperature range.

The elastic member 14' can block the opening of the passage $PA_{in}$ until the pressure of the applied coolant water reaches a predetermined pressure, when the opening of the passage $PA_{in}$ is blocked by biasing the sealing function portion 13C (in concrete the biased portion F) toward the opening of the passage $PA_{in}$. On the other hand, when the pressure of the applied coolant water reaches the predetermined pressure, the opening of the passage $PA_{in}$ can be opened by shortening the sealing function portion 13C by deforming or displacing.

Figure 16A:
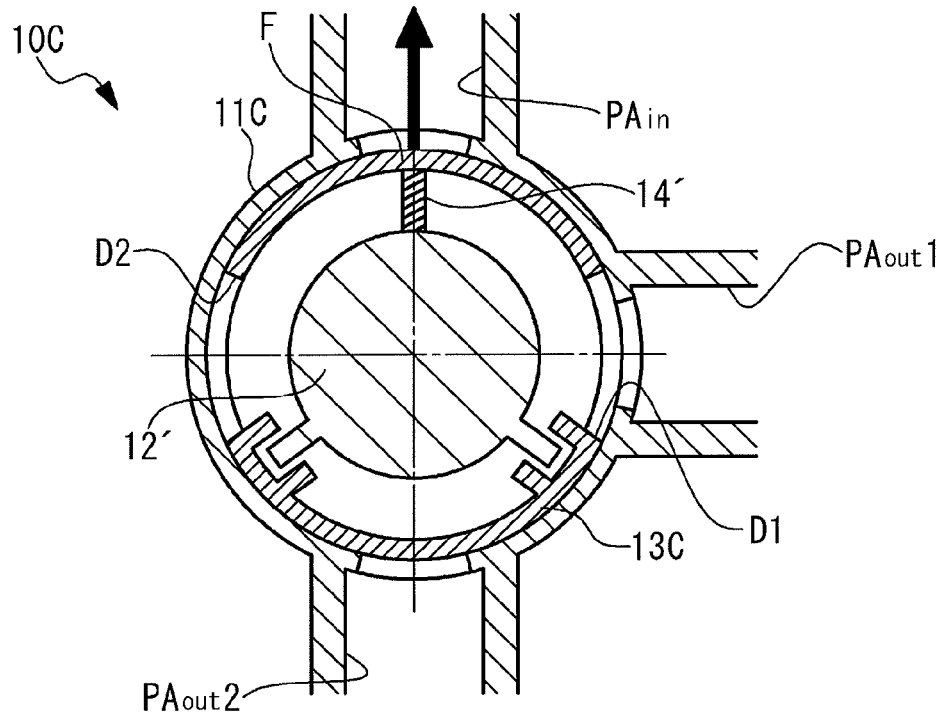
FIG. 16A and FIG. 16B illustrate a first figure of an explanatory diagram of an operation of the third embodiment.
Figure 16B:
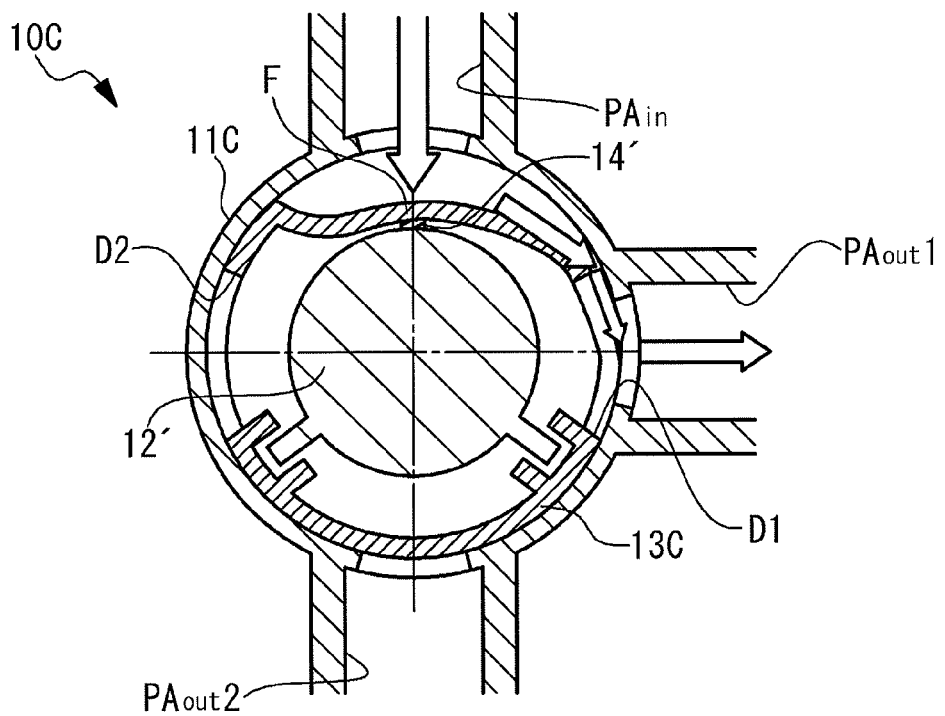
Figure 17:
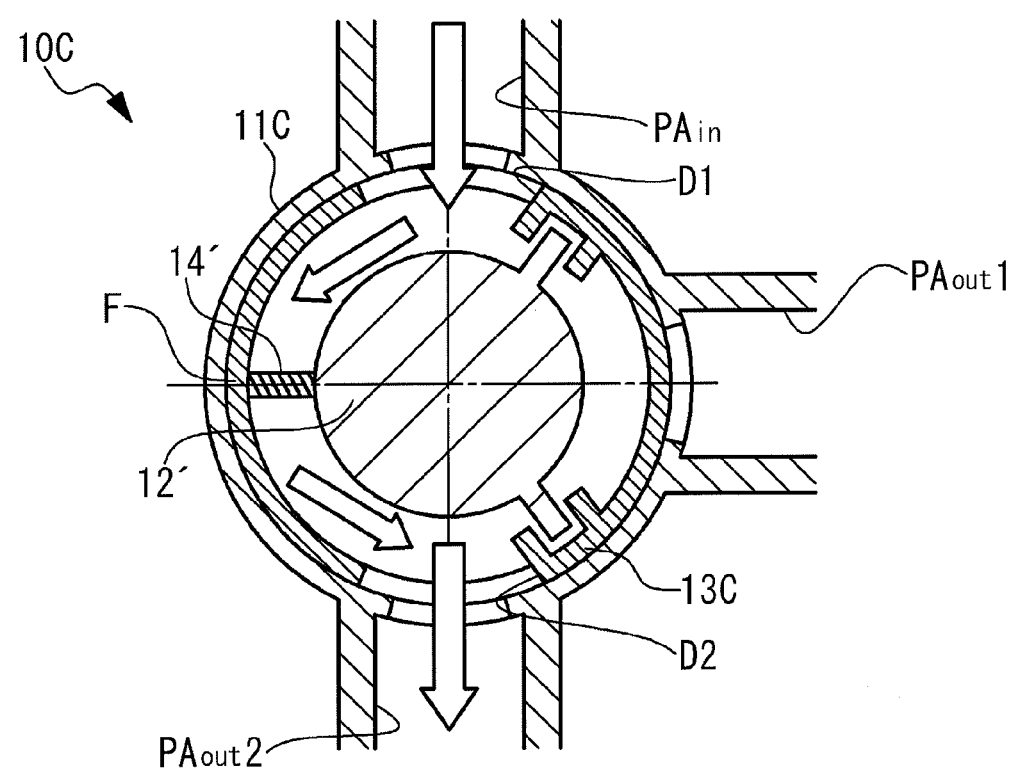
FIG. 17 illustrates a second figure of the explanatory diagram of the operation of the third embodiment.

The cooling control device 10C has the water-stopping mode and the block stagnation mode at a different phase as the cooling control of the engine 2A. And, in the cooling control of the engine 2A, the phase of the rotor 12' is controlled as follows. FIG. 16A, FIG. 16B and FIG. 17 illustrate an operation of the cooling control device 10C. FIG. 16A and FIG. 16B illustrate the cooling control device 10C at the water-stopping mode. FIG. 17 illustrates the cooling control device 10C at the block stagnation mode. FIG. 16A illustrates a phase where the pressure of the applied coolant water is less than the predetermined pressure. FIG. 16B illustrates a phase where the pressure of the applied coolant water reaches the predetermined pressure.

As illustrated in FIG. 16A, in the cooling control device 10C, at the water-stopping mode, the phase of the rotor 12' is controlled to a phase where the biased portion F faces with the opening of the passage $PA_{in}$. In this case, the elastic member 14' biases the sealing function portion 13C toward the opening of the passage $PA_{in}$ in order to block the opening of the passage $PA_{in}$. And, when the pressure of the coolant water is less than the predetermined pressure, the opening of the passage $PA_{in}$ is blocked by contacting the biased portion F to the opening of the passage $PA_{in}$. Thereby, the circulation of the coolant water to the engine 2A is stopped.

As illustrated in FIG. 16B, when the pressure of the applied coolant water reaches the predetermined pressure, the elastic member 14' is shortened by deforming or displacing the sealing function portion 13C. Thereby, outflowing of the coolant water via the passage $PA_{out}1$ can be performed by opening the opening of the passage $PA_{in}$. Therefore, in this case, the coolant water can be circulated to the engine 2A urgently.

As illustrated in FIG. 17, in the cooling control device 10C, the phase of the rotor 12' is controlled to a phase as follows at the block stagnation mode. That is, the phase of the rotor 12' is controlled to a phase where the biased portion F faces with a wall portion of the intermediate portion M of which phase is different from the opening of the passage $PA_{out}1$ by 180 degrees. In this case, in the cooling control device 10C, the opening D1 is positioned at a position where the opening D1 faces with the opening of the passage $PA_{in}$, and the opening D2 is positioned at a position where the opening D2 faces with the opening of the passage $PA_{out}2$. Thereby, the circulation of the coolant water via the cylinder head 2b is allowed when the openings of the passages $PA_{in}$ and $PA_{out}2$ are opened.

Simultaneously, in the cooling control device 10C, at the block stagnation mode, a circumference portion of the sealing function portion 13C positioned at a position of which phase is different from the biased portion F by 180 degrees faces with the opening of the passage $PA_{out}1$. And, the circumference portion blocks the opening of the passage $PA_{out}1$ when being pressed to the opening of the passage $PA_{out}1$ by the pressure of the coolant water. Thereby, the circulation of the coolant water via the cylinder block 2a is simultaneously stopped.

In the cooling control device 10C, when the mode is switched from the water-stopping mode to the block stagnation mode, the rotor 12' can be rotated in a rotation direction described below. That is, the rotor 12' can be rotated in a rotation direction directly heading the wall portion without going through from the opening of the passage $PA_{in}$ to an opening of another passage.

The cooling control device 10C may have a structure in which the phase of the rotor 12' is controlled to a phase where the biased portion F faces with the opening of the passage $PA_{out}1$ at the block stagnation mode. And, the cooling control device 10C may have the all flow amount mode instead of the block stagnation mode. In this case, the passage $PA_{out}1$ may act as a passage for outflowing the coolant water supplied to the cylinder head 2*b*, and the passage $PA_{out}2$ may act as a passage for outflowing the coolant water supplied to the cylinder block 2*a*.

The cooling control device 10C has a structure in which elastic member 14' biases the sealing function portion 13C so that the sealing function portion 13C contacts the opening of the passage $PA_{in}$ of the passages $PA_{in}$, $PA_{out}1$ and $PA_{out}2$ in accordance with the phase control of the rotor 12'. That is, the cooling control device 10C has a structure in which the elastic member 14' does not individually bias the sealing function portion 13C at different phases of the rotor 12' with respect to the passages $PA_{in}$, $PA_{out}1$ and $PA_{out}2$ in the phase control of the rotor 12'.

Next, a description will be given of the function and effect of the cooling control device 10C. The cooling control device 10C can improve the responsibility of the rotor 12' as in the case of the cooling control device 10A when the elastic member 14' biases the sealing function portion 13C toward the opening of the passage $PA_{in}$. And, as in the case of the cooling control device 10A, the coolant water can be circulated to the engine 2A urgently. Thereby, in these points, the cooling control of the engine 2A can be preferably performed. The cooling control device 10C can allow the circulation of the coolant water via the cylinder block 2*a* and the cylinder head 2*b* when the pressure of the coolant water reaches the predetermined pressure by daringly switching a mode to the water-stopping mode at high rotation operation of the engine 2A of which demand for cooling is increased.

In the cooling control device 10C, the opening of the passage $PA_{out}2$ opens when the opening of the passage $PA_{out}1$ is blocked. Therefore, degradation of the responsibility of the rotor 12' can be suppressed compared to the case where outflowing of the coolant water is perfectly blocked as in the case of the cooling control device 10A.

In concrete, it is preferable that the cooling control device 10C has the housing portion 11C, the rotor 12' and the sealing function portion 13C, and the sealing function portion 13 has an opening as follows. That is, it is preferable that when the sealing function portion 13C blocks one of the openings of a plurality of exit side passages (here, the passages $PA_{out}1$ and $PA_{out}2$), the sealing function portion 13C has an opening that opens at least one of the openings of the plurality of the exit side passages other than the blocked opening.

In this case, the housing portion 11C may have a structure in which the inside shape of the intermediate portion M is a circular shape from a view along axis line C and a plurality of exit side passages are provided. And, the rotor 12' may have a structure in which the rotation center of the rotor 12' is provided in accordance with the center of the inside shape of the intermediate M from a view along the axis line C. And, the sealing function portion 13C may have a circular cylinder. Further, the sealing function portion 13C concentrically arranged with the rotor 12'. And, a part other than the biased portion F may contact the intermediate portion M at least in the usage temperature range.

The rotor 12' may have a structure as follows. That is, the rotor 12' may have a hollow and openings communicating inside with outside in accordance with the openings provided at the circumference of a sealing function portion (here, the sealing function portion 13C). In this case, when a clearance between the sealing function portion and the rotor 12' is reduced, the coolant water can be circulated via at least the rotor 12' of the clearance and the rotor 12'. Cooling control devices 10D, 10E and 10F described later have the same structure.

Fourth Embodiment

Figure 18:
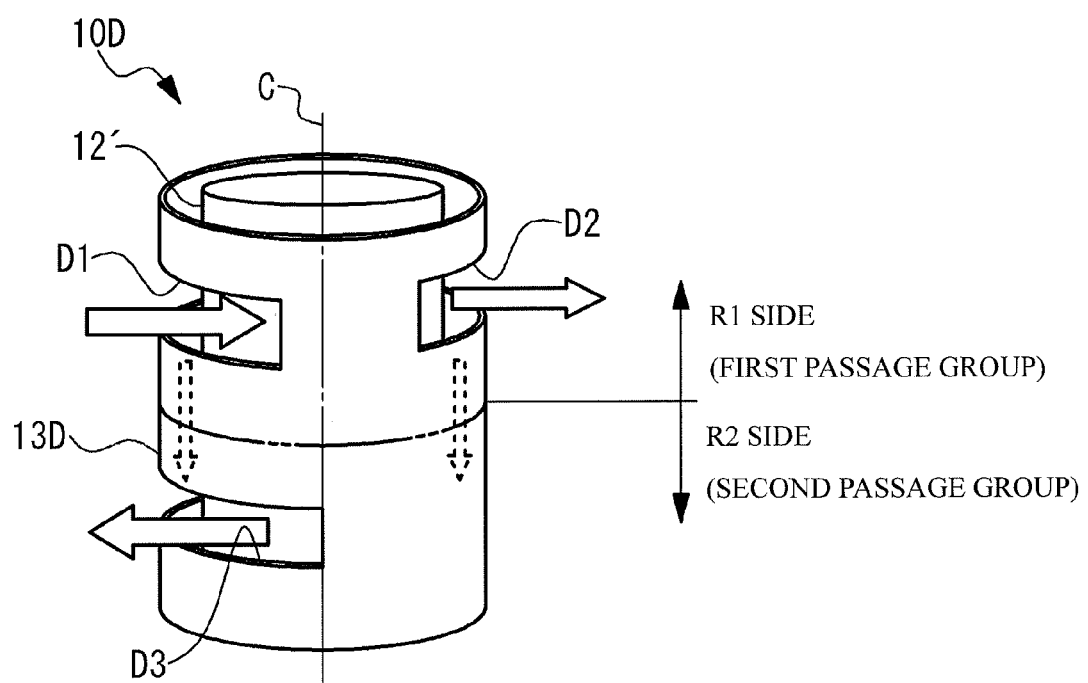
FIG. 18 illustrates a perspective view of a main part of a fourth embodiment.
Figure 19:
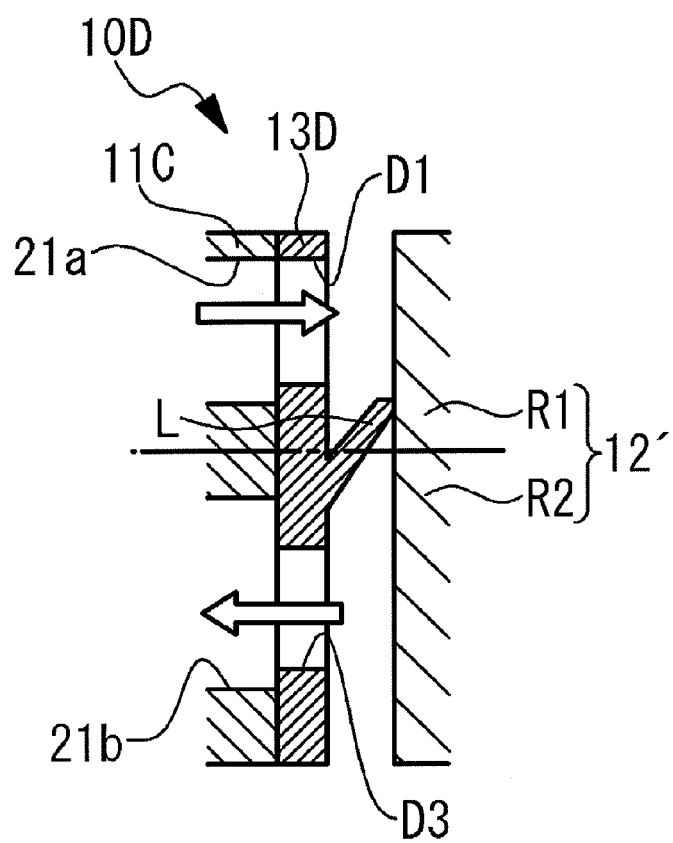
FIG. 19 illustrates a cross sectional view of the main part of the fourth embodiment.

FIG. 18 illustrates a perspective view of a main part of the cooling control device 10D. FIG. 19 illustrates a cross sectional view of the main part of the cooling control device 10D. FIG. 19 illustrates a cross sectional view including the axis line C and includes a part of the main part of FIG. 18 together with the housing portion 11C. The cooling control device 10D is substantially the same as the cooling control device 10C in points that the cooling control device 10C is applied to the rotary valve 20 of FIG. 9, a sealing function portion 13D is provided instead of the sealing function portion 13C, and the W/P 1 is further provided.

In concrete, the cooling control device 10D structured as mentioned above has the housing portion 11C as the housing portion 21. And, the rotor 12' acts as the rotor 22. And, the sealing function portion 13D is provided between the housing portion 21 and the rotor 22. And, the elastic member 14' is provided between the rotor 22 and the sealing function portion 13D.

In the cooling control device 10D, the rotor 12' is used as the rotor 22, and the rotor 12' has the valving elements R1 and R2 in concrete. And, the sealing function portion 13D is provided toward the valving elements R1 and R2 along the axis line C in concrete with respect to the rotor 12'. Therefore, the sealing function portion 13D has a plurality of openings including the opening D3 that can open the opening of a passage formed by the second passage 21*b*. The sealing function portion 13D is substantially the same as the sealing function portion 13C except for a point that a pressed portion L is further provided.

The pressed portion L is a portion pressed to the rotor 12' among a first passage group and a second passage group in a direction along the axis line C. In the cooling control device 10D, passages formed by the first passage 21*a* form the first passage group having a passage circulating the coolant water going from the W/P 1 to the engine 2A. And, passages formed by the second passage 21*b* from the second passage group having a passage circulating the coolant water going from the engine 2A to the W/P 1. And, the first passage group and the second passage group are located at different positions in a direction along the axis line C.

In concrete, the pressed portion L is located between the rotor 12' and the circumference of the sealing function portion 13D, and is provided all along the inner side circumference. And the pressed portion L has a lip shape extending toward the rotor 12' and the first passage group.

Next, a description will be given of a main function and effect of the cooling control device 10D. Here, in the cooling control device 10D, a plurality of passages includes the first passage group and the second passage group. Therefore, the coolant water is leaked from the first passage group side to the second passage group side via the clearance between the rotor 12' and the circumference of the sealing function portion 13D. This may result in great reduction of the flow amount of the coolant water supplied to the engine 2A.

With respect to this case, the pressed portion L prevents or suppresses the leakage of the coolant water from the first passage group to the second passage group. Therefore, the cooling control device 10D can prevent or suppress the reduction of the flow amount of the coolant water supplied to the engine 2A. As a result, in the cooling control of the engine 2A, the reliability of the engine 2A can be improved when the flow amount of the coolant water supplied to the engine 2A is secured.

In concrete, the pressed portion L may have a lip shape extending toward the rotor 12' and the first passage group.

Thereby, it is possible to press the pressed portion L to the rotor 12' so that the sealing performance is enhanced with use of a pressure difference of the coolant water between the first passage group and the second passage group. As a result, the reduction of the flow amount of the coolant water supplied to the engine 2A can be preferably prevented or suppressed. And, thereby, the pressed portion L may be flexible. As a result, the sealing performance can be maintained without disturbing the deforming or displacing of the sealing function portion 13D during circulating the coolant urgently.

Fifth Embodiment

Figure 20:
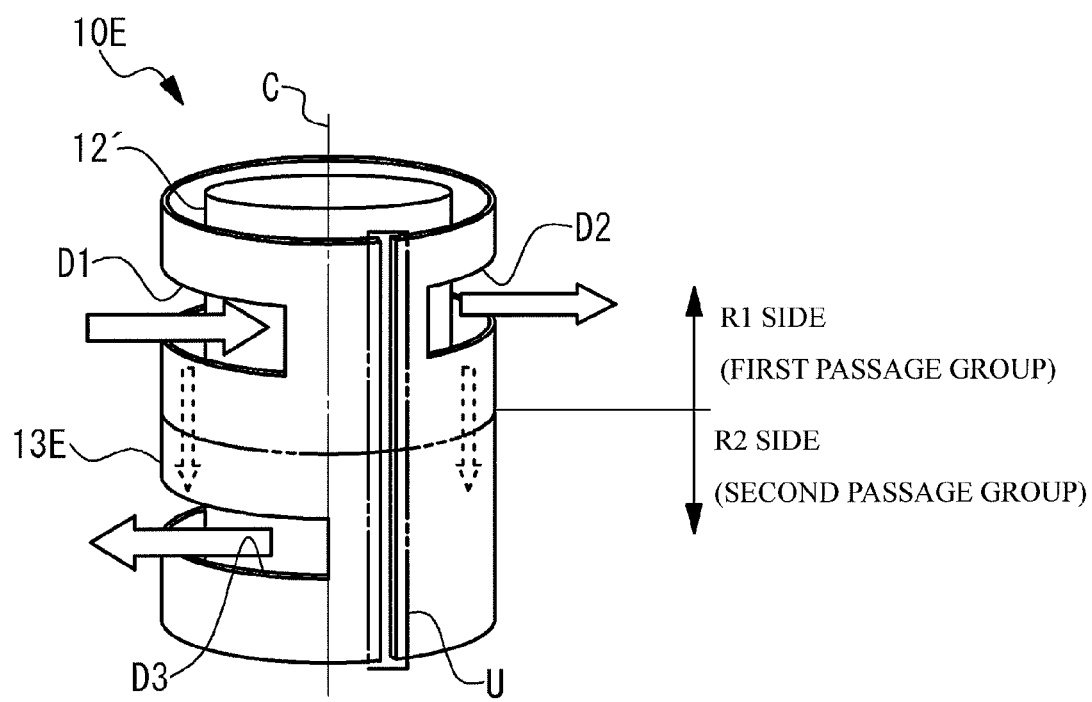
FIG. 20 illustrates a perspective view of a main part of a fifth embodiment.

FIG. 20 illustrates a perspective view of a main part of the cooling control device 10E. The cooling control device 10E is substantially the same as the cooling control device 10D except for a point that a sealing function portion 13E is provided instead of the sealing function portion 13D. The same changing may be applied to the cooling control device 10C. The sealing function portion 13E is substantially the same as the sealing function portion 13D except for a point that a divided portion U is provided. The divided portion U has divided parts of the sealing function portion 13E that are divided in a circumference direction. In concrete, the divided portion U is formed along the axis line C. A linear expansion coefficient of the sealing function portion 13E is larger than that of the housing portion 11C made of an aluminum alloy.

Next, a description will be given of a main function and effect of the cooling control device 10E. The sealing function portion 13E deforms so that an interval of the divided parts of the divided portion U is reduced as the temperature of the coolant water increases. As a result, increasing of the contact force of the sealing function portion 10E toward the housing portion 11C caused by thermal expansion is suppressed. Therefore, the cooling control device 10E can preferably perform the cooling control of the engine 2A in a point that the responsibility is suppressed because of increasing of the above-mentioned contact force.

Sixth Embodiment

Figure 21:
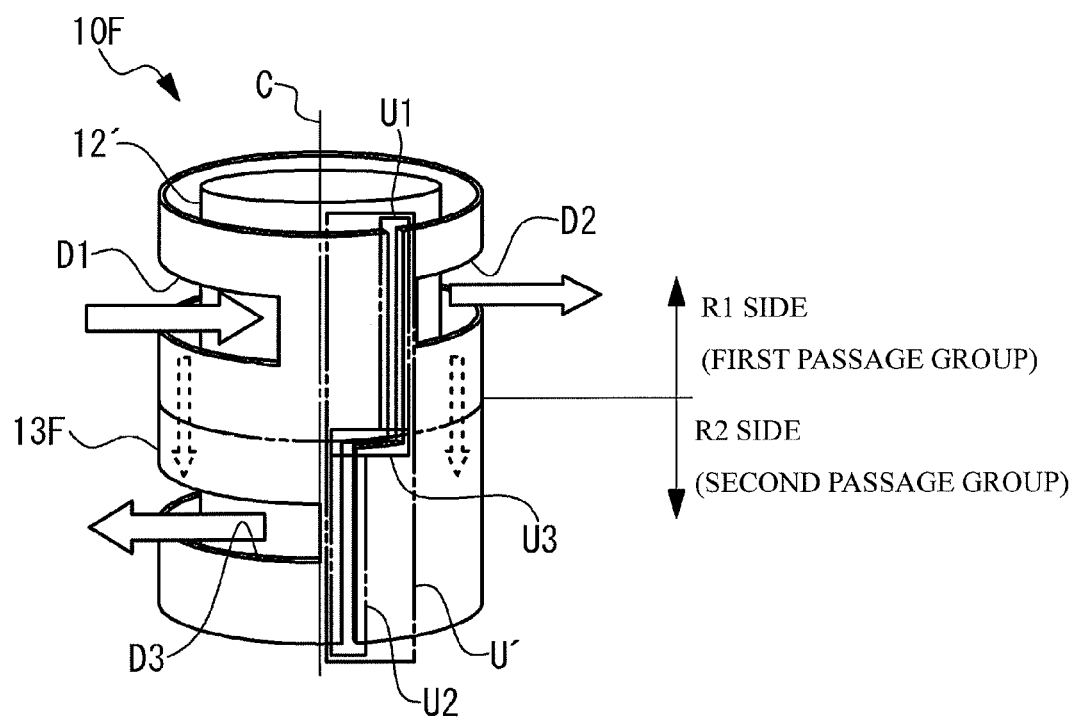
FIG. 21 illustrates a cross sectional view of the main part of the fifth embodiment.
Figure 22:
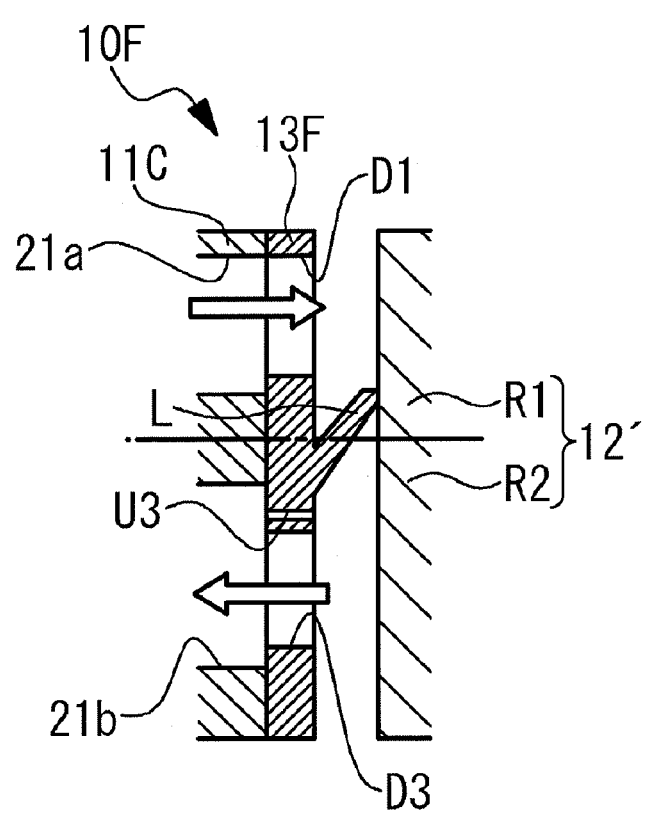
FIG. 22 illustrates a cross sectional view of the main part of the fifth embodiment.

FIG. 21 illustrates a perspective view of a main part of the cooling control device 10F. FIG. 22 illustrates a cross sectional view of the main part of the cooling control device 10F. FIG. 22 illustrates a cross section including the axis line C and illustrates a part of the main part illustrated in FIG. 21 together with the housing portion 11C. The cooling control device 10F is substantially the same as the cooling control device 10E except for a point that a sealing function portion 13F is provided instead of the sealing function portion 13E. The sealing function portion 13F is substantially the same as the sealing function portion 13E except for a point that a divided portion U' instead of the divided portion U.

The divided portion U' has a partially divided portions U1 and U2 that are a first partially divided portion and a second partially divided portion provided along the axis line C at different phases on the first passage group side and the second passage group side. And the divided portion U' is provided along a circumference direction and has a partially divided portion U3 that is a third partially divided portion coupling the partially divided portions U1 and U2. The partially divided portion U3 is provided in a part of the sealing function portion F on the second passage group side compared to the pressed portion L in a direction along the axis line C.

Next, a description will be given of a main function and effect of the cooling control device 10F. Here, in the cooling control device 10E, the coolant water is leaked from the first passage group side to the second passage group side via a space formed between the divided parts of the divided portion U. With respect to this case, the cooling control device 10F increase pressure loss of the coolant water leaking in the partially divided portion U3. Therefore, the cooling control device 10F suppresses the degradation of the responsibility as in the case of the cooling control device 10E, and suppresses flow amount reduction of the coolant water supplied to the engine 2A.

In concrete, the divided portion U' may have a structure in which the partially divided portion U3 is formed in a part of sealing function portion F on the second passage group side compared to the pressed portion L in a direction along the axis line C. Thereby, the interval between the divided parts of the partially divided portion U3 can be reduced and the clearance between the divided parts can be blocked with use of the pressure difference of the coolant water of the first passage group and the second passage group. As a result, the flow amount reduction of the coolant water supplied to the engine 2A can be preferably suppressed.

As mentioned above, preferable embodiments of the present invention are described in detail. The present invention is not limited to the specifically disclosed embodiments and variations but may include other embodiments and variations without departing from the scope of the present invention described in the CLAIMS.

For example, the sealing function portion of the present invention may be a structure having a sealing member as a part corresponding to the contact portion of the sealing function portion 13A. That is, a part other than the contact portion E of the sealing function portion 13A in the embodiments mentioned above may not be structured with a sealing member.

When a plurality of entrance side passages are provided, the elastic member may bias the sealing function portion and make the sealing function portion contact at least one of the openings of the plurality of entrance side passages in accordance with the phase control of the rotor. And, the elastic member may bias the sealing function portion and make the sealing function portion contact whole of the openings of the plurality of entrance side passages.

DESCRIPTION OF LETTERS OR NUMERALS

W/P 1
engine 2A, 2B
cylinder block 2a, 2a'
cylinder head 2b, 2b'
cooling control device 10A, 10B, 10C, 10D, 10E, 10F
housing portion 11A, 11B, 11C, 21
rotor 12, 12', 22
sealing function portion 13A, 13B, 13C, 13D, 13E, 13F
elastic member 14, 14'

The invention claimed is:
1. An engine cooling control device comprising:
   a housing portion that has a plurality of passages including at least one entrance side passage for inflowing coolant water of an engine and at least one exit side passage for outflowing the coolant water of the engine;
   a rotor that is provided in an intermediate portion to which the plurality of passages open and controls a circulation of the coolant water of the engine via the plurality of passages with a rotation operation;
   a sealing function portion that is provided between the housing portion and the rotor and can roll together with the rotor; and an elastic member that is provided between the rotor and the sealing function portion and biases the sealing function portion to openings of the plurality of passages in accordance with a phase control of the rotor and selectively makes the sealing function portion contact the openings, wherein:

a rotation center of the rotor is located so that distances between the rotation center and the openings of the plurality of passages opening toward the intermediate portion are different from each other from a view along the axis line of the rotation center; and the elastic member individually biases the sealing function portion toward the openings of the plurality of passages with respect to each different phase of the rotor, and changes contact force of the sealing function portion that selectively contacts the openings of the plurality of passages having different distances.

2. The engine cooling control device according to claim 1:

wherein:

a pump that squeezes the coolant water of the engine is further comprised;

the plurality of passages have a first passage group and a second passage group, the first passage group having a passage circulating coolant water from the pump to the engine, the second passage group having a passage circulating coolant water from the engine to the pump;

the first passage group and the second passage group are located at a different position in a direction along an axis line of a rotation center of the rotor; and the sealing function portion has a pressed portion pressed to the rotor between the first passage group and the second passage group in a direction along the axis line of the rotation center of the rotor.

3. The engine cooling control device as claimed in claim 1, wherein a space is provided between the sealing function portion and an opening of a predetermined passage of the plurality of passages under a condition that the sealing function portion is biased to the opening of the predetermined passage.

4. The engine cooling control device as claimed in claim 1 further comprising a plurality of rolling elements in four directions of the rotation center of the rotor from a view along the axis line of the rotation center of the rotor.

5. The engine cooling control device as claimed in claim 1 wherein an opening of at least one of the plurality of passages has a seal face formed in accordance with an outside shape of the sealing function portion that faces with the opening under a condition where a phase of the rotor is controlled to a corresponding phase.

* * * * *